US011081330B2

United States Patent
Bachus et al.

(10) Patent No.: US 11,081,330 B2
(45) Date of Patent: Aug. 3, 2021

(54) CHEMICAL ETCHING OF EMITTER TIPS

(71) Applicant: Trajan Scientific Australia Pty Ltd., Ringwood (AU)

(72) Inventors: Kyle John James Bachus, Adelaide (AU); Herbert Tze Cheung Foo, Ringwood (AU); Heike Ebendorff-Heidepriem, Adelaide (AU); Yvonne Marie Stokes, Adelaide (AU); Josef Adam Giddings, Adelaide (AU)

(73) Assignee: Trajan Scientific Australia Pty Ltd, Ringwood (AU)

( * ) Notice: Subject to any disclaimer, the term of this patent is extended or adjusted under 35 U.S.C. 154(b) by 60 days.

(21) Appl. No.: 16/433,610

(22) Filed: Jun. 6, 2019

(65) Prior Publication Data
US 2019/0378704 A1    Dec. 12, 2019

(30) Foreign Application Priority Data
Jun. 6, 2018    (AU) .................................. 2018902035

(51) Int. Cl.
*H01J 49/00*    (2006.01)
*H01J 49/16*    (2006.01)
*C03C 15/00*    (2006.01)

(52) U.S. Cl.
CPC ............ *H01J 49/167* (2013.01); *C03C 15/00* (2013.01)

(58) Field of Classification Search
CPC ................................ H01J 49/167; C03C 15/00
USPC ................................ 216/8, 83, 103; 250/288
See application file for complete search history.

(56) References Cited

U.S. PATENT DOCUMENTS

| 4,469,554 | A | 9/1984 | Turner |
| 5,290,398 | A | 3/1994 | Feldman et al. |
| 5,772,903 | A | 6/1998 | Hirsch |
| 5,800,666 | A | 9/1998 | Bonham, Jr. et al. |
| 5,985,166 | A | 11/1999 | Unger et al. |
| 7,491,341 | B2 | 2/2009 | Kelly et al. |
| 2007/0235408 | A1* | 10/2007 | Kelly .................... H01J 49/167 216/8 |
| 2016/0217994 | A1* | 7/2016 | Oleschuk .......... C03B 37/01228 |

OTHER PUBLICATIONS

Bachus, et al ("Fabrication of axicon microlenses on capillaries and microstructured fibers by wet etching," Optics Express, vol. 24, No. 18, Sep. 5, 2016) (Year: 2016).*

(Continued)

*Primary Examiner* — Michael Maskell
(74) *Attorney, Agent, or Firm* — Wesley Malherek; Kelly Holt & Christenson PLLC

(57) ABSTRACT

A method of forming a capillary tube for electrospray ionization (ESI) having at least one tip with a desired tip profile. The method includes providing a pre-finished capillary tube of substantially homogenous material. The capillary tube has a first end and an internal bore. The first end of the pre-finished capillary tube is wet-etched in an etchant for an etch duration. A protective fluid flows through the internal bore of the capillary tube at a flow rate during the etch duration and the flow rate and the etch duration are determined to obtain the desired tip profile below a liquid level of the etchant.

20 Claims, 28 Drawing Sheets

(56) References Cited

OTHER PUBLICATIONS

Bachus, Kyle, et al. "Fabrication of axicon microlenses on capillaries and microstructured fibers by wet etching." Optic express 24,18 (2016): 20346-20358, 13 pages.
Bell, R. P., K. N. Bascombe, and J. C. McCoubrey. "262. Kinetics of the depolymerisation of trioxan in aqueous acids, and the acidic properties of aqueous hydrogen fluoride." Journal of the Chemical Society (Resumed) (1956): 1286-1291.
Cabrini, S., et al. "Axicon lens on optical fiber forming optical tweezers, made by focused ion beam milling." Microelectronic engineering 83(2006): 804-807.
Eah, Sang-Kee, Wonho Jhe, and Yasuhiko Arakawa. "Nearly diffraction-limited focusing of a fiber axicon microlens." Review of scientific instruments 74.11 (2003): 4969-4971.
Fogler, H. Scott, Kasper Lund, and C. C. McCune. "Acidization III—The kinetics of the dissolution of sodium and potassium feldspar in HF/HCl acid mixtures." Chemical Engineering Science 30.11 (1975): 1325-1332.
Grosjean, Thierry, et al. "Fiber microaxicons fabricated by a polishing technique for the generation of Bessel-like beams." Applied optics 46.33 (2007): 8061-8067.
Kuchmizhak, A., et al. "High-quality fiber microaxicons fabricated by a modified chemical etching method for laser focusing and generation of Bessel-like beams." Applied optics 53.5 (2014): 937-943.
Liu, Jianqiang, et al. "In situ monitoring and universal modelling of sacrificial PSG etching using hydrofluoric acid." [1993] Proceedings IEEE Micro Electro Mechanical Systems. IEEE, 1993, 6 pages.
Melkonyan. Henrik, et al. "Efficient fiber-to-waveguide edge coupling using an optical fiber axicon lens fabricated by focused ion beam," IEEE Photonics Journal 9.4 (2017): 10 pages.
Monk, David J., David S. Soane, and Roger T. Howe, "A review of the chemical reaction mechanism and kinetics for hydrofluoric acid etching of silicon dioxide for surface micromachining applications." Thin Solid Films 232.1 (1993): 1-12.
Monk, David J., David S. Soene, and Roger T. Howe. "Hydrofluoric acid etching of silicon dioxide sacrificial layers II. Modeling." Journal of the Electrochemical Society 141.1 (1994): 270-274.
Noulty, Robert A., and Derek G. Leaist. "Diffusion of aqueous hydrofluoric acid and aqueous potassium fluoride." Electrochimica acta 30.8 (1985): 1095-1099.
Palmer, William George. "CCXVI.—The action of aqueous hydrofluoric acid on silica." Journal of the Chemical Society (Resumed) (1930): 1656-1664.
Şimşek, Elif Uzcengiz, Bartu Şimşek, and Bulend Ortaç. "CO 2 laser polishing of conical shaped optical fiber deflectors." Applied Physics B 123.6 (2017): 176, 9 pages.
Spierings, G. A. C. M. "Wet chemical etching of silicate glasses in hydrofluoric acid based solutions." Journal of Materials science 28 (1993): 6261-6273.
Giddings et al., "Wet Chemical Etching of Microstructured Silicon Dioxide Fibres", May 24, 2019, 21 pages.
Bachus et al., "Adapting Photonics Fabrication Processes to the Development of Improved ESI-MS Emitter Tip Design", ASMS Jun. 3, 2018, 2 pages.

* cited by examiner

Perform mathematical modelling of the etching of a pre-finished capillary tube to the desired emitter tip profile The mathematical modelling predicts the range of flow rate, etching time and type of the protection fluid, required for making the desired tip profile.

⬇

With the protection fluid flowing at the specified flow rate, the first end (14) of the capillary is immersed below the liquid level (18) of the etchant, which is contained in a plastics tube held within a 3D printed holder (20) that has a depth viewing window (22) for monitoring the etching progress

⬇

After the specified time as predicted by the model, the first end (14) is removed from the etchant

⬇

The tip profile is inspected via optical microscopy or electron microscopy

FIG. 27

We assume the fibre is perfectly symmetrical, hence model it in two-dimensional cylindrical coordinates with a line of symmetry running through the centre of the bore.

The velocity of the flow in the system is very small, so we solve for Stokes flow.

The water is less dense than the acid, so we use the Boussinesq approximation for buoyancy.

The water mixes with the acid, so we solve the advection-diffusion equations for the effective concentration.

Based on the concentration of the acid, we can calculate how much $SiO_2$ is etched away.

The etching of the $SiO_2$ 'uses up' some of the acid, so we calculate how much acid has been used and subtract it at the $SiO_2$-acid interface.

FIG. 28

CHEMICAL ETCHING OF EMITTER TIPS

FIELD

The present invention relates to a capillary tube for electrospray ionization (ESI) mass spectrometry. The invention may also have application to capillary tubes used in biochemical sampling and analysis, particularly applications requiring flow in or out of nozzles and particularly in applications involving dispersion of samples. However, the invention may also have broader application to any purpose where a fine tip capillary is required. The invention may have application to a capillary tube with either a singular tip at the termination of the capillary bore or a plurality of tips at the termination of each capillary bore of a multibore capillary tube, e.g. for electrospray through each tip. The invention also relates to methods for preparing such a capillary tube.

BACKGROUND

Electrospray ionization (ESI) is a commonly used ionization method for mass spectrometry (MS) enabling efficient generation of gas phase ions from a solution containing the analyte of interest. Typically, a fine tip capillary tube (emitter) is required for the most efficient generation of gas phase ions in very low flow rate ESI (often referred to as micro-ESI or nano-ESI). The internal diameter, orifice profile and hydrophobic surface of the emitter has a direct impact on the performance of the ESI process and therefore must be controlled. It is well-known from literature that the electrohydrodynamics at the emitter tip plays a significant role in the ionization efficiency of ESI. Currently, fine tip capillary tubes are achieved by heating and pulling down a glass capillary tube by which means the tip can be pulled to a very small outer diameter with the consequent effect of simultaneously tapering the inner diameter. In the field of ESI-MS, a tapered inner diameter results in a propensity for clogging at the elution point and thus robustness and ultimate longevity are sacrificed.

US patent application 2016/0217994 to Oleschuk et al discloses a capillary tube with plural internal capillary bores, each terminating at a nozzle structure, thus forming a micronozzle array at one end of the capillary tube. The micronozzle array is formed by reliance on a non-homogenous structure of the capillary tube using a combination of silica and borosilicate glass in a spaced array of tubes and fillers in a preform, before the preform is drawn down into the plural internal bore capillary tube. The differential etch rates of the two glass materials is relied upon to provide the micronozzle structure at the termination of each capillary bore. In order to preserve the inside diameter of the internal bores, water is passed through the internal bores while the capillary tube is immersed in the liquid etchant. The flow rate of the water was selected to produce negligible widening of the internal diameter of the internal bore. Then the etching time is selected to optimize shape and length of the micronozzle structure.

The difficulty with Oleschuk is in achieving the desired arrangement and spatial control of the two different materials making up the preform. The fabrication and arrangement of custom-doped borosilicate is an intricate and expensive process that can lack reproducibility. Such a fabrication method has proved to be difficult in practice, wherein the lack of reproducibility of the starting preform creates functional differences in the final plural internal bore capillary tube.

U.S. Pat. No. 7,491,341 (Kelly et al) discloses a method of making a tapered capillary tube with a constant inner diameter. An end of the capillary tube is immersed in a liquid etchant while water flows through the inner bore. In Kelly, the capillary tube is etched to completion below the liquid level, thus defining an annular sharp ring around the inner bore. Kelly relies upon the effect of the concave meniscus surrounding the external surface of the capillary tube to form the tapering on the outside diameter above the etchant level. Kelly therefore affords no control over the geometry of the tapering of the outside diameter. To do so would require control over the surface chemistry between the glass surface and etchant solution, which could alter the meniscus shape. It is expected that this would be cumbersome and difficult to control.

The present inventors have recognized that the flow rate of water or other protective fluid flowing through the internal bore can be used to effect control over the etch rate of the end profile of the capillary tube to obtain a desired tip profile suitable for ESI-MS and potentially other sampling and analysis applications.

An object of the present invention is to provide a method of forming a capillary tube and capillary tubes formed thereby with desired emitter tip profiles. An object of at least a preferred embodiment of the present invention is to provide a method of forming a capillary tube and capillary tubes formed thereby which is capable of maintaining the inner diameter of the internal bore while simultaneously tapering the outside diameter to form a desired profile. An alternative object of the invention is to provide the public with a useful choice.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY

In accordance with a first aspect of the present invention, there is provided a method of forming a capillary tube for electrospray ionization (ESI) having at least one tip with a desired tip profile, the method comprising:

providing a pre-finished capillary tube of substantially homogenous material, the capillary tube having a first end and an internal bore; and wet-etching the first end of the pre-finished capillary tube in an etchant for an etch duration and flowing a protective fluid through the internal bore of the capillary tube at a flow rate during the etch duration, wherein the flow rate and the etch duration are determined to obtain the desired tip profile below a liquid level of the etchant.

By submerging the capillary tube in hydrofluoric acid whilst pumping water through the center hole it is possible to etch down the outer diameter of the capillary tube whilst maintaining a constant bore diameter. The water creates a concentration gradient around the end of the capillary tube which controls the geometry etched. Experiments have shown that higher flow rates create wider, convex geometries, while lower flow rates create narrower, concave geometries.

One or both of the flow rate and the etch duration may be predetermined. Alternatively, one or both of the flow rate and the etch duration may be determined in real time by monitoring tip development during the etching process.

When the flow rate and the etch duration are predetermined, the method may further include the step of withdrawing the first end from the etchant after the etch duration. Alternatively, if the tip development is monitored then the withdrawal of the first end from the etchant may occur once the desired tip profile is reached.

Preferably, the flow rate is selected according to a number of factors:
The flow rate should be sufficient to protect the inside diameter from the etchant and thus to maintain the internal diameter of the internal bore.
On the other hand, the flow rate will have an effect on the etchant concentration gradient extending radially away from the opening of the internal bore. The greater the flow rate, the greater the diluting effect.

Accordingly, the flow rate should be minimized to negate the effects of dilution but sufficient to maintain the internal diameter of the capillary tube.

The volumetric flow rate may be constant for the etch duration or alternatively, the flow rate may be variable over the etch duration. Preferably, the flow is continuous for the whole of the etch duration. Alternatively, the flow may be discontinuous, pulsed or intermittent during the etch duration provided that this does not have a deleterious effect on the internal diameter. Preferably, the volumetric flow rate is about 10 nL/min and less than 75 nL/min. The preferred range of flow rates is about 10-50 nL/min. In a most preferred form of the invention, the flow rate is 25±5 nL/min. Lower flow rates and longer etch times generally result in the desired tip profile.

The etch duration is preferably in the range of about 10-40 mins, most preferably about 10-15 minutes.

Each of the above variables of flow rate and etch duration may be determined empirically by conducting experiments to determine the effect on tip geometry.

Alternatively one or both of the flow rate and the etch duration is preferably predetermined by a mathematical model of a system including the etchant, the etching of the pre-finished capillary tube and the flow of protective fluid through the internal bore. The mathematical model may use Stokes flow for the velocity profile within the system. The mathematical model may use advection-diffusion equations for the concentration of the etchant.

The mathematical model is preferably run a plurality of times, each time with a different set of variable inputs to produce a plurality of simulated tip profiles. A preferred simulated tip profile is preferably selected from the plurality of simulated tip profiles generated by running the mathematical model with a variety of inputs. The method may involve comparing the plurality of simulated tip profiles to the desired tip profile to select the preferred simulated tip profile.

The variable inputs to the mathematical model may include density, viscosity and chemical composition of a protective fluid and the protective fluid selected for use is based on the inputs to the preferred simulated tip profile. In other words, the selected protective fluid will have density, viscosity and chemical composition corresponding to or approximating that of the inputs to the mathematical model in the run that produces the preferred simulated tip profile.

Likewise, the inputs to the mathematical model may include flow rate of the protective fluid and the determined flow rate is based on the input flow rate to the preferred simulated tip profile. The determined etch duration is preferably also based on the preferred simulated tip profile.

The desired tip profile may incorporate any of the following geometries: tapered i.e. conical, convex cone, concave cone, wells and holes, either as singular features or in combinations.

The desired tip profile is preferably a tapered end face of the capillary tube with the tapering on the end face providing a gradual reduction in outside diameter of the end face towards a sharp annulus at the opening of internal bore. Thus, the desired tip profile may be a conical shape. Some reduction in the outside diameter of the capillary tube will also occur but it is the tapered end face which provides the desired tip profile which when used as an emitter tip for ESI exhibits desirable performance characteristics. Preferably the tapered end face extends at an angle, which is measured from the edge of the internal bore to the capillary tube outer diameter, of <10 degrees, relative to a longitudinal axis through the internal bore.

The desired tip profile is preferably defined by the end face having varying angles of inclination relative to the longitudinal axis which generally progress from higher to lower angles towards the opening of the emitter tip internal bore. The lowest angle of inclination of the end face may be nearest to the opening, save for the annulus. This decreasing angle may lead to a concave cone shape at the end face of the emitter tip.

The pre-finished capillary tube may have an inside diameter within the range of about 4 µm to 50 µm. Preferably, the range of inside diameters is about 4-25 µm. Most preferably, the range of inside diameters suitable for nano-ESI-MS is 4-10 µm.

An additional optional step may include heating and drawing down the pre-finished capillary tube to a smaller internal diameter. This process would generally give rise to a tapered internal diameter e.g. 1-2 µm to suit specific applications.

The resulting emitter tip profile following the wet-etching may have an annulus with an inner radius of 0.5-25 µm and an outer radius of 5-180 µm. Preferably the inner radius at the annulus is 2.5-12.5 µm and the outer radius is 5-80 µm.

The outside diameter of the pre-finished capillary tube can be of any dimension<530 µm and preferably matches that of commercially available fused silica capillary tubing. Accordingly, the outside diameter is preferably either 150±5 µm or 360±10 µm. It is noted that the capillary tube is usually coated in a protective material having a thickness of between 10-20 µm. Thus, the overall outside diameter includes this coating of protected material.

The pre-finished capillary tube may be drawn from a glass preform with a predetermined internal diameter and outside diameter as is known in the art. The internal bore(s) of the glass preform creates the internal bore(s) of the capillary tube when the preform is drawn down. It is also possible to create a capillary tube with a plurality of internal bores. This can be created by drilling, stacking, extruding a plurality of spaced bores in the preform before drawing down to a pre-finished plural internal bore capillary tube. Thus, the present invention relates to the formation of a capillary tube having one tip or plural emitter tips at the termination of each internal bore. The flow rate ranges and etch durations cited above may be applicable to a capillary tube with a single emitter tip or plural emitter tips. The flow rate is suitably determined at the output of a liquid chromatography pump. The flow rate may be equally divided between the plural capillary bores.

The substantially homogenous material may include any of the following including:

a glass structure such as, natural quartz, fused silica, doped silica, borosilicate, sodium silicate, conductive glass Bulk metallic glasses stainless steel.

The etchant may include any of the following (preferred starting concentrations as indicated:

hydrofluoric based etchants such as hydrofluoric acid (48 wt %) and ammonium bifluoride nitric acid (70 wt %), sulfuric acid (98 wt %)

hydrochloric acid (35 wt %)

hydrogen peroxide (30%) and combinations of the above.

In some embodiments it is desired to have a long outside taper on the emitter tip typical of a heated and pulled emitter tip. In such cases, mechanical grinding may also be used prior to, or after the wet etching in the fabrication of the emitter tip to generate an extended taper on the outer diameter of the capillary tube. In a preferred method, the first end of the pre-finished capillary tube is ground to form a tapered tip, which may have a final outside diameter 30-80 am. The wet etching is subsequently used to form the final emitter tip profile.

The protective fluid may include any liquid forming a protective barrier and diluting the etchant concentration at the tip as required. Suitable fluids include pure water, any liquid that is miscible with water, dichloromethane, hexane, benzene, toluene, nitrogen gas, and combinations thereof.

After withdrawal from the etchant, the capillary tube may be subjected to a quenching process to quench further etching and clean the tip of debris. The quenching may involve immersion of the first end into water or other suitable liquid with a high flow rate of flushing water through the internal bore for a quench duration.

Optionally, it is desirable to chemically modify the etched tip by a hydrophobic group through a silanization reaction. This makes the tip less wettable by the solution used during the electrospray ionization and thus improves emitter tip performance. The preferred silane reagents include any linear, branched, cyclic, substituted and non-substituted phenyl, substituted and non-substituted phenyl-alkyl, or fluorinated alkyl-silane reagents with the alkyl chain containing more than 2 carbons and each silane's silicon covalently linked to more than one leaving group such as chloro, methoxyl or ethoxyl. Further control of the etch time is desired to achieve optimal surface roughness to impart a super-hydrophobic surface on the emitter tip following silanization.

In accordance with a second aspect of the present invention, there is provided a method of forming a capillary tube for ESI, the capillary tube having at least one tip, the method comprising:

providing a pre-finished capillary tube having a first end, a longitudinal axis and an internal bore with an opening at the first end; and wet-etching the first end of the capillary tube in a liquid etchant and flowing a protective fluid through the internal bore of the capillary tube into the etchant to obtain a desired emitter tip profile at the at least one emitter tip, the desired emitter tip profile approximating a cone which is defined by a peripheral wall having varying angles of inclination relative to the longitudinal axis which generally progress from higher to lower angles towards the opening of the internal bore.

As discussed above, the desired emitter tip profile is formed at least in part by the end face at the first end of the capillary tube. This end face is in the form which approximates a cone and more preferably a concave cone resulting from the progression of angles of inclination. In other words, the tip profile may approximate or substantially conform to the external surface of a solid of revolution obtained by 360° rotation of a nonlinear curve around the longitudinal axis of the capillary tube.

Where the surface of the solid revolution is obtained by rotation of a non-linear curve, the radius of curvature is preferably maximum with respect to the inner diameter(s) and outer diameter of the initial glass capillary/fiber. This solid revolution obtained by rotation of a nonlinear curve, where the absolute value of the slope of the first tangent at curve of the glass nozzle tip should be maximized. Preferably the cone is centered at the longitudinal axis. Another descriptor of the cone shape is a right circular cone. The cone may be truncated where the internal bore defines a flat point of the cone shape.

Any of the features described above in connection with the first aspect of the invention may have application to this aspect of the invention.

In accordance with a third aspect of the present invention, there is provided a capillary tube for ESI, the capillary tube having a longitudinal axis, a first end and a tip at the first end approximating a cone which is defined by a peripheral wall having varying angles of inclination relative to the longitudinal axis which angles generally progress from higher to lower angles towards the opening of the internal bore.

Any of the features described above in any of the foregoing aspects of the invention may have application to this aspect of the invention.

A further aspect of the invention may related to a method of predetermining parameters of the etching method by a mathematical model of a system including the etchant, the etching of the pre-finished capillary tube and the flow of protective fluid through the internal bore. The mathematical model may be run a plurality of times, each time with a different set of variable inputs to produce a plurality of simulated tip profiles such that a preferred simulated tip profile is selected therefrom.

Any of the features described above in any of the foregoing aspects of the invention may have application to this aspect of the invention.

The methods and techniques described here may be implemented on one or more special purpose computing devices as defined below, with the various different steps and even sub-steps above performed on the same special purpose computing devices, on linked special purpose computing devices or special purpose computing devices linked with a control system of the apparatus 10, such as an NC numerical control.

It will be understood that the invention disclosed and defined in this specification extends to all alternative combinations of two or more of the individual features mentioned or evident from the text or drawings. All of these different combinations constitute various alternative aspects of the invention.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIG. 27 is a flowchart of the overall process from the initial modelling to the inspection of the etched capillary; and FIG. 28 is a flowchart of the etching process.

DETAILED DESCRIPTION OF ILLUSTRATIVE EMBODIMENTS

Figure 1:
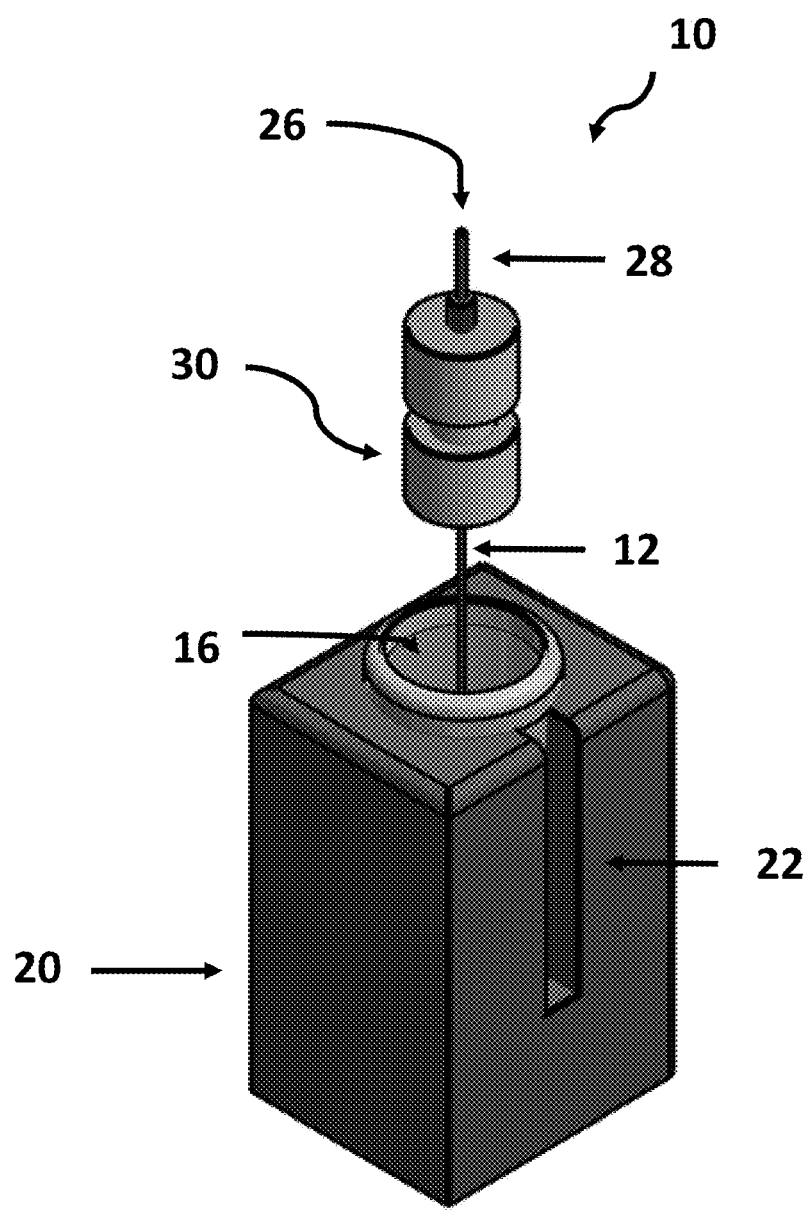
FIG. 1 is a schematic representation of a method according to a preferred embodiment of the present invention.

Microstructured glass fiber fabrication processes in photonics include preform fabrication by either modified chemical vapor deposition (MCVD), extrusion, staking or ultrasonic drilling/milling. The preform is then drawn to fiber to create glass structures with unique optical properties. Using precision post-processing techniques, these microstructured fibers may then be employed in single-bore and multi-bore emitter tips used in mass spectrometry FIG. 1 is a schematic representation of apparatus 10 employed in the wet-chemical etching method according to the preferred embodiment. The prefinished silica capillary tube 12 is etched using a wet-chemical etching method schematically illustrated in FIG. 1 using a solution of HF (48 wt %). The prefinished capillary tube 12 has an outside diameter of either 150±10 µm or 350±10 µm. The capillary tube 12 has an internal bore with an inside diameter of 5 to 11 µm. The capillary tube 12 has a first end 14 (see FIG. 2A) which is immersed into a solution of hydrofluoric acid (48 wt %). The first end 14 is immersed below the liquid level 18 of the hydrofluoric acid solution.

The hydrofluoric acid is contained in a plastics tube held within a 3D printed holder 20 which has a depth viewing window 22 for monitoring the etching progress.

In order to protect the internal bore 13 from the etching effects of the hydrofluoric acid, a protective fluid, typically pure water, is pumped through the internal bore 13 towards the first end 14 where it flows into the hydrofluoric acid solution. The flow of water in the internal bore 13 is effected by a nanopump 26. The nanopump 26 is connected to the capillary tube 12 via a transfer capillary tube 28 and liquid junction 30.

The effect of the water flowing through the internal bore 13 and into the hydrofluoric acid solution 16 will protect the internal bore 13 from the etching effects of the hydrofluoric acid solution 16 due to the low or negligible concentration of hydrofluoric acid at the opening 34 of the internal bore 13 at the first end 14. This will protect the internal bore 13 from being etched by the hydrofluoric acid solution 16.

Figures 2A, 2B:
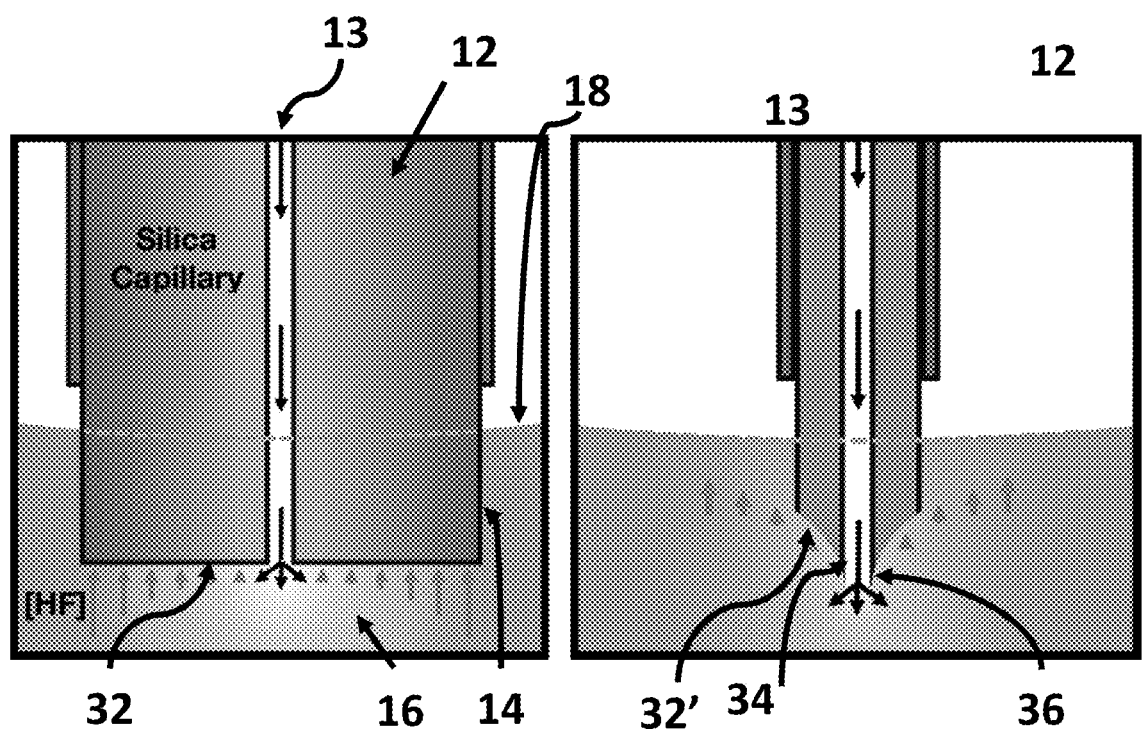
FIG. 2A is a schematic representation of the dilution gradient of the etchant and the initial emitter tip profile of the capillary tube.
FIG. 2B is a schematic representation of the dilution gradient and the final emitter tip profile.

The pumping of water through the internal bore 13 will also have the effect of diluting the hydrofluoric acid solution 16 according to a dilution profile whereby the concentration increases radially and outwardly from the internal bore 13, as depicted by the arrows directed upwardly in FIG. 2A towards the end surface 32 at the first end 14 of the capillary tube 12.

The effect of the dilution gradient overtime will lead to differential etch rates of the end surface 32, 32' leading to the emitter tip profile illustrated in FIG. 2B. The desired emitter tip profile for increased performance in mass spectrometry is a emitter tip approximating a cone defined by a concave peripheral end wall 32'. A lower flow rate through the internal bore 13 will reduce the effect of the etchant in the region immediately surrounding the opening of the internal bore 13, leading to the pronounced annular sharp ring 36 (see FIG. 5) at the opening of the internal bore 13. It can be seen from FIG. 2B that the inclination of the peripheral end wall relative to the longitudinal axis of the tube 12 is lowest closer to the annular sharp ring 36, compared to the inclination where the surface 32' meets the outside diameter. As can be seen, the inclination generally gradually increases radially outwardly from the ring 36, leading to the concave cone shape as depicted. This emitter tip profile is highly desired for ESI in mass spectrometry.

Figure 3:
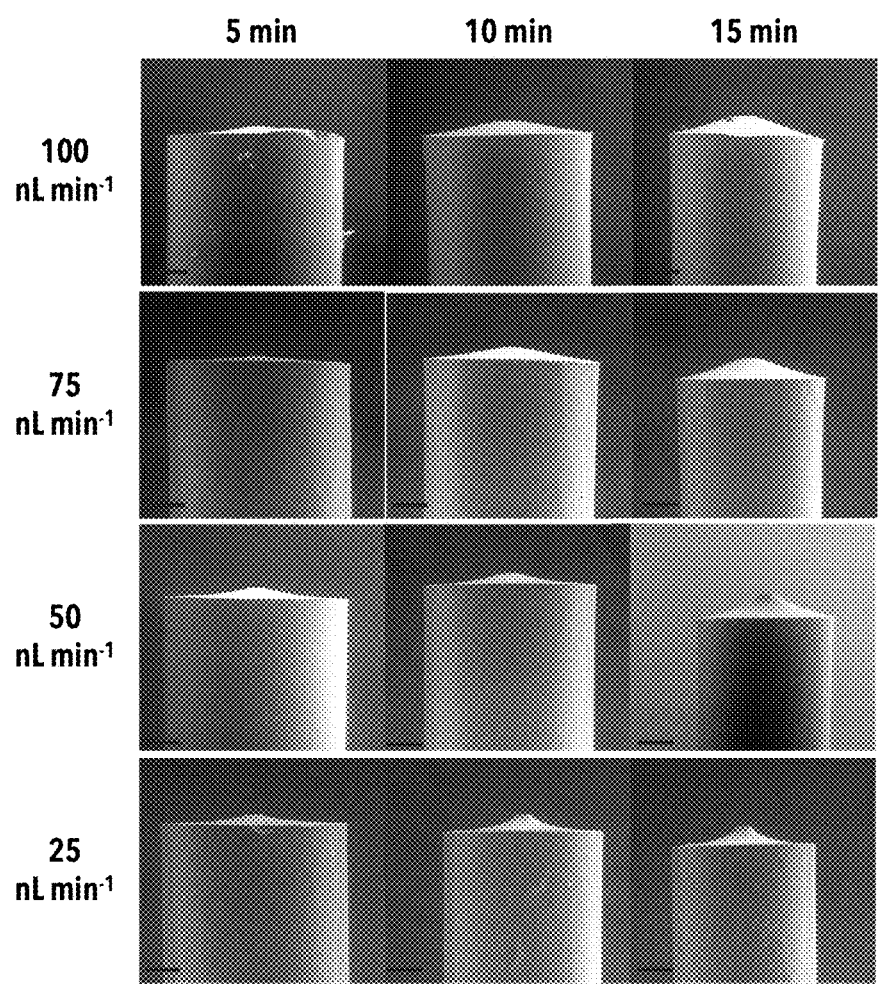
FIG. 3 is an array of scanning electron micrographs of wet-etched silica capillary tubes showing the effect of flow rate and etch duration on the emitter tip profile.

FIG. 3 illustrates the effect of etch duration and volumetric flow rate on the emitter tip geometry. All capillary tubes were initially 150/7 μm OD/ID. The scale bar in each image is 20 μm. The most desirable emitter tip profiles are achieved in the bottom right hand corner. The most highly desirable emitter tip profiles are those for 25 and 50 nL/min volumetric flow rates and 15 minutes duration. Volumetric flow rates of 75 nL/min and above did not produce acceptable results and it was not considered that extending the etch duration beyond 15 minutes would produce improved results.

It can be seen from FIG. 3 that the outside diameter of the capillary tube also undergoes reduction in the etchant.

Figure 4:
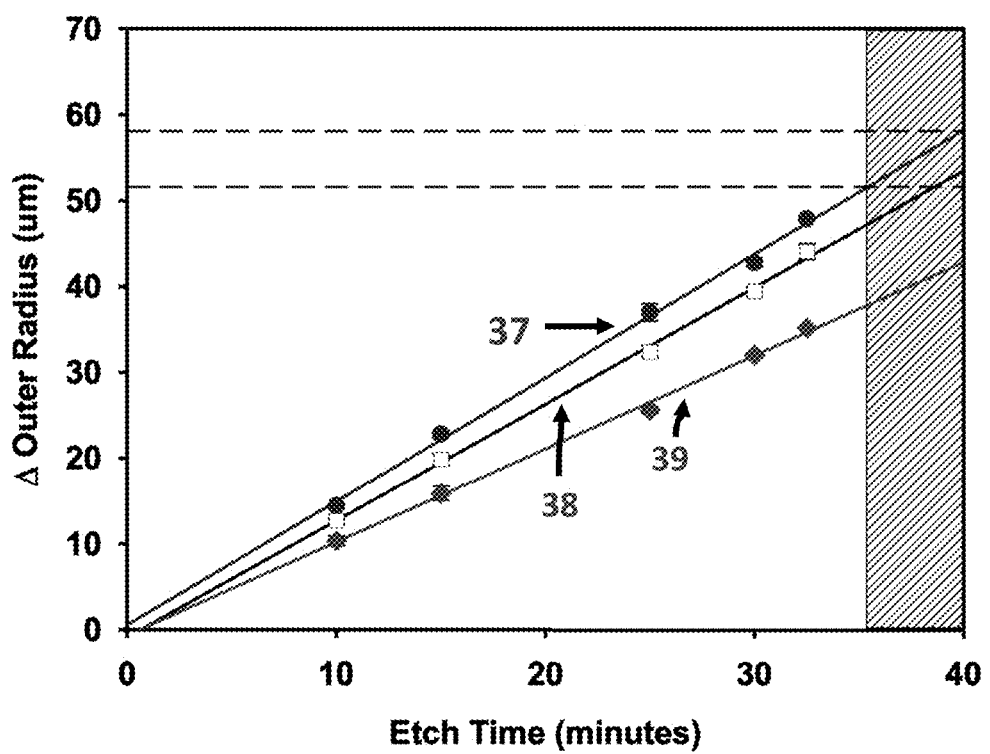
FIG. 4 is a plot displaying the change in outer radius as a function of etch duration and volumetric flow rate.

FIG. 4 is a plot displaying the change in outer radius as a function of etch duration and volumetric flow rate. The solid triangles, open squares, and solid circles refer to 100, 50, and 25 nL/min volumetric flow rates. The change in outer radius generally increased as a function of etch duration and volumetric flow rates. The emitter tip shape and size (radius) are important features for the production and performance of the final product.

Figure 5:
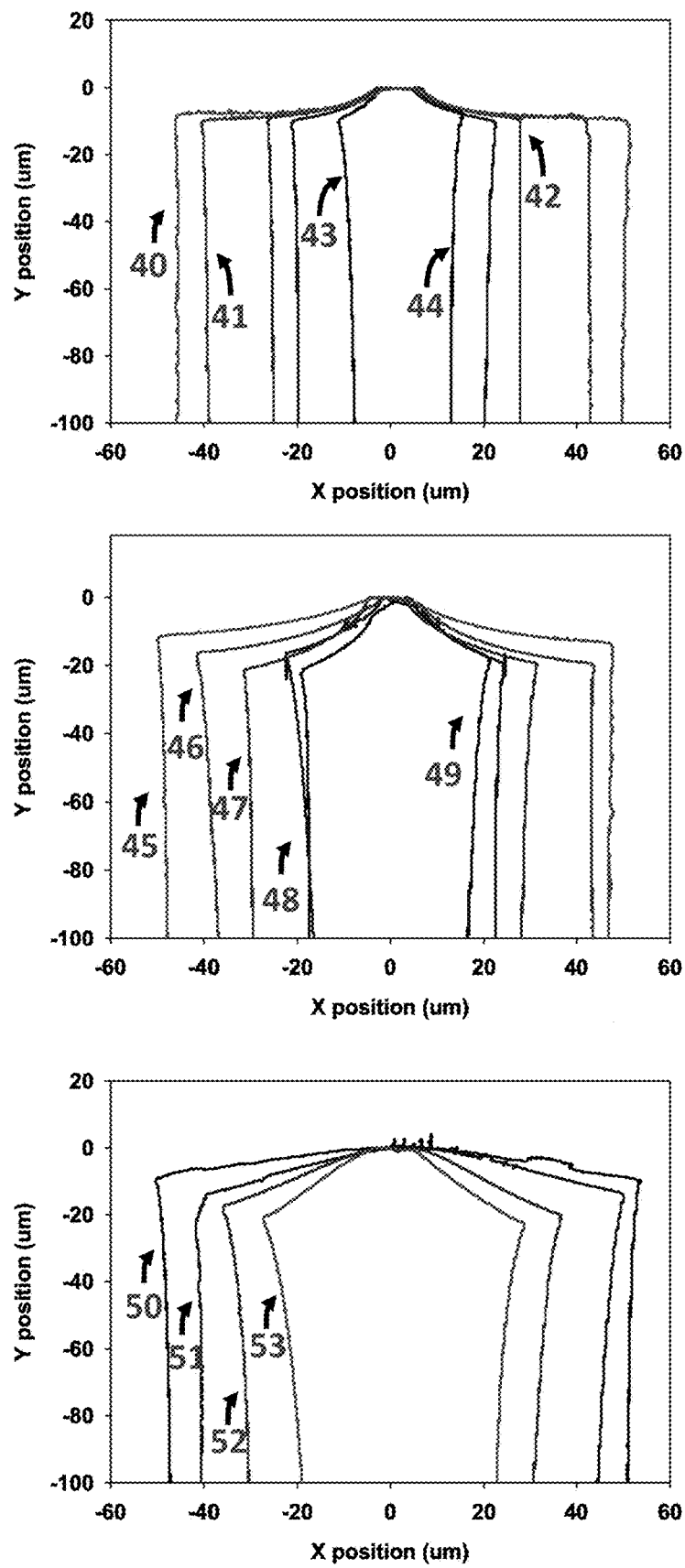
FIG. 5 illustrates the effect of etch duration and flow rate on the emitter tip profile for capillary tubes etched with 25, 50, and 100 nL/min volumetric flow rate through the internal bore.

FIG. 5 illustrates the effect of etch duration and flow rate on the emitter tip profile for capillary tubes etched with 25 (top), 50 (middle), and 100 (bottom) nL/min volumetric flow rate through the internal bore. Etch time increases from the outer profiles (10 minutes) to the inner profile (30 minutes) in 5-minute increments. As shown, reducing the volumetric flow rate and increasing the time generally increased the sharpness of annular ring 36, with 30 minutes producing the best result from those depicted.

The etch duration and the flowrate may be determined empirically. Alternatively these and other variables may be determined according to a mathematical model as explained below. The overall process including the mathematical model is shown in the flowchart in FIG. 27.

1. INTRODUCTION TO MATHEMATICAL MODEL

Hydrofluoric acid is a solution of hydrogen fluoride (HF) in water which is commonly used to etch and polish glass due to its high reactivity towards $SiO_2$ molecules, where the chemical reaction governing the etching of $SiO_2$ by HF is generally regarded to be given by equation 1.

$$SiO_2 + 6HF \rightarrow H_2SiF_6 + 2H_2O. \quad \text{(Eq. 1)}$$

In concentrations above 48% by weight the HF spontaneously forms fumes which decreases the concentration unpredictably and are highly dangerous to inhale. As a result, it is common practise in the etching of $SiO_2$ to use 48% by weight hydrofluoric acid in order to maximise the etching properties of the hydrofluoric acid, whilst maintaining predictable etch rates and safety.

When HF is dissolved in water some of the HF molecules dissociate into highly mobile H+ and F− ions which, for low concentrations, then bond with the undissociated HF molecules forming $HF_2^-$. Hence, for low concentration solutions of hydrofluoric acid the equilibria relations are given by equation 2.

$$HF \rightleftharpoons F^- + H^+, \quad HF + F^- \rightleftharpoons HF_2^-. \quad \text{(Eq. 2)}$$

However, for higher concentrations, we find the existence of $H_2F_3^-$ and $H_3F_4^-$ ions. These higher polymeric ions are highly reactive to $SiO_2$ however their equilibria relations are unknown.

Noulty and Leaist [1985] investigated the diffusivity of aqueous hydrofluoric acid experimentally at concentrations of 0.002 to 0.2% HF by weight—measurements at stronger concentrations were unsuccessful due to the formation of bubbles of HF vapor. They measured the binary diffusion coefficients of hydrofluoric acid in water and found for very low concentrations the binary diffusion coefficient decreased rapidly as the concentration was increased up to 0.003% by weight. Increasing the concentration past 0.003% by weight resulted in a gradual increase in the binary coefficient as the concentration was increased. However, although they showed a slight variation in the diffusion coefficient over a small concentration range, it is common in the modelling of etching using hydrofluoric acid to assume the diffusivity is constant.

We will use the advection-diffusion equation with Stokes flow and the relation given in (1) to calculate a flux condition for the concentration on the fiber surface to model the etching process developed by Bachus et al. [2016]. Due to Noulty and Leaist [1985] showing a variation in diffusivity with concentration at low concentrations and a lack of data for the diffusivity at higher concentrations, the governing equations for our model will be derived with a concentration dependent diffusivity. FIG. 28 is a flowchart of the mathematical model.

We will investigate the effects of varying the model parameters and compare our simulated results with experiments in order to validate our model and determine whether a constant diffusivity is sufficient and, if so, what its value should be.

2. THE MATHEMATICAL MODEL

Figure 6:
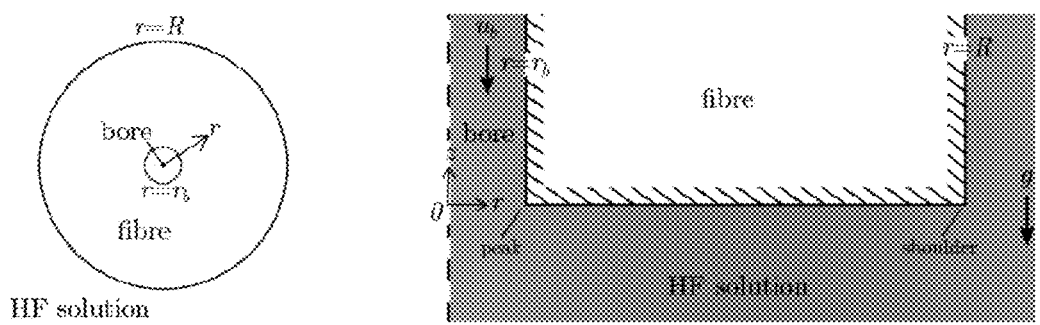
FIG. 6 illustrates the specifications and co-ordinate system used in the mathematical model with FIG. 6a being the tip and FIG. 6(b) being the axisymmetric co-ordinate system.

We model the system in axisymmetric cylindrical coordinates r=(r, z), with the z-axis running through the centre of the fibre and the r-axis measuring distance outwards from the centre, both in μm. We set the fibre bottom to be at z=0 and gravity, g, points vertically downwards such that g=(0, −g) and denote the bore radius to be $r_b$ and the initial outer radius to be R. Due to the viscosity, μ, of water and HF being very similar, we assume $\mu = \mu_{HF}$ throughout the entire system. The co-ordinate system used is shown in FIG. 6 where the dashed line in FIG. 6b at r=0 runs along the centre of the bore and is a line of symmetry. For convenience, we refer to the point where the bore wall meets the fibre bottom as the 'peak' and has coordinates $r_{pk} = (r_{pk}, z_{pk})$ and the point where the fibre bottom meets the fibre side as the 'shoulder' and has coordinates $r_{sh} = (r_{sh}, z_{sh})$.

2.1 Velocity

We model the flow profile, u=(ur, uz), as Stokes flow with the Boussinesq approximation for buoyancy due to the density difference between water and the hydrofluoric acid. Due to the density of hydrofluoric acid being greater than that of water, we may express the density, ρ=ρ(c) where c is the volume fraction of 48% by weight hydrofluoric acid, at any point as equation 3.

$$\rho = \rho_a - B(c), \quad \text{(Eq. 3)}$$

where ρa is the density of 48% by weight hydrofluoric acid and B(c)>0. This gives us the mass and momentum conservation equations as equations 4 and 5.

$$\nabla \cdot u = 0, \quad \text{(Eq. 4)}$$

$$\nabla p = \mu \nabla^2 u - g\, B(c), \quad \text{(Eq. 5)}$$

for pressure, p, and the del operator in cylindrical coordinates, ∇.

For concentrations of hydrogen fluoride less than 48% by weight, the density profile is close to linear in c, hence the density is given by equation 6.

$$\rho = c\rho_a + (1-c)\rho_w, \quad \text{(Eq. 6)}$$

where $\rho w$ is the density of water. Expressing this in the form given in equation 3 gives:

$$B(c) = (1-c)(\rho_a - \rho_w). \quad \text{(Eq. 7)}$$

The flow rate of the water flowing though the bore is given by Q=QnL/min and is modelled as Poiseuille flow moving in the negative z direction with flow profile u=(0, −ub), where:

$$u_b = 2Q(r_b^2 - r^2)/(\pi r_b^4) \text{ for } 0 \le r \le r_b. \quad \text{(Eq. 8)}$$

2.2 Concentration

We model the concentration using the advection-diffusion model, given in axisymmetric cylindrical coordinates by $$\partial c/\partial t = \nabla \cdot (D(c)\nabla c) - u\nabla c, \quad \text{(Eq. 9)}$$

where $D(c)=D(c)nm2/s$ is the concentration dependent diffusivity. The chemical reaction governing the etching of SiO2 by HF is given by (1), hence we have a flux condition on the fiber boundary due to etching. In order to avoid having a second concentration species in our model we consider the H2SiF6 to have the same properties as water. We can calculate the molar flux of HF due to etching, je, as 6 times the number of moles of SiO2 etched, given by $$j_e = 6\rho_s ER/M_s, \quad \text{(Eq. 10)}$$

for the concentration dependent etch rate, ER=ER(c)nm/s, and density and molar mass of SiO2, $\rho s$ and Ms, respectively. By multiplying (10) by the molar mass of HF, MHF, we may convert the molar flux to the mass flux of HF molecules. By noting that the mass of HF molecules is given by 0.48 $\rho a$ c and as the HF mass flux on the fiber is equal to the negative of the HF mass flux due to etching, the fiber boundary condition is given by $$D(c)\partial c/\partial n = -12.5 M_{HF} \rho_s ER/M_s, \quad \text{(Eq. 11)}$$

where $n=(n_r, n_z)$ is the unit normal vector to the surface pointing away from the acid.

2.3 Fiber Surface

We denote the location of the fiber surface as $r_f = r_f(r_f(t), z_f(t))$. The equation governing the fiber surface location is given by equation 12.

$$dr_f/dt = ERn. \quad \text{(Eq. 12)}$$

We use the relation proposed by Fogler et al. [1975] (for molar flux, which we equate with (10) and re-arrange) to express the etch rate as $$ER = k_1 c^\alpha (1 + k_2 c^\beta), \quad \text{(Eq. 13)}$$

for $k_1 = k_1$ nm/s and $k_2$ is dimensionless. This dictates that $k_1 c^\alpha$ dominates at low concentrations, where Spierings [1993] has shown that the relationship between concentration and etch rate is close to linear and hence we expect $\alpha \approx 1$, and $k_1 k_2 c^{\alpha+\beta}$ dominates at high concentrations.

2.4 Non-Dimensionalization

We use the scales $$r = r_b r', \ u = k_1 k_2 u', \ t = r_b t'/(k_1 k_2), \ p = \mu k_1 k_2 p'/r_b, \quad \text{(Eq. 14)}$$

dimensionless parameters $$B_c = -g\, r_b^2(\rho_a - \rho_w)/(\mu k_1 k_2), \ U_c = 2Q/(\pi k_1 k_2 r_b^2),$$

$$J_c = 12.5 M_{HF} \rho_s/(M_s \rho_a), \quad \text{(Eq. 15)}$$

for non-dimensional buoyancy, inlet flow and flux constants, respectively, and the dimensionless diffusivity function $$D_c(c) = D(c)/(k_1 k_2 r_b). \quad \text{(Eq. 16)}$$

Dropping the primes for convenience gives the non-dimensional equations as $$\nabla \cdot u = 0, \quad \text{(Eq. 17)}$$

$$\nabla p = \nabla^2 u + B_c(1-c), \quad \text{(Eq. 18)}$$

$$\partial c/\partial t = \nabla \cdot (D_c(c)\nabla c) - u \cdot \nabla c, \quad \text{(Eq. 19)}$$

$$dr_f/dt = c^\alpha(1/k_2 + c^\beta)n, \quad \text{(Eq. 20)}$$

with inlet condition $$u_b = U_c(1 - r^2) \text{ for } 0 \le r \le 1, \quad \text{(Eq. 21)}$$

and subject to $$D_c(c)\partial c/\partial n = -J_c c^\alpha(1/k_2 + c^\beta), \quad \text{(Eq. 22)}$$

on the fiber boundary.

3. NUMERICAL SIMULATION

We let $$d\varphi/dt = (\varphi^{n+1} - \varphi^n)/(\Delta t), \quad \text{(Eq. 23)}$$

for time step size, $\Delta t$, and any function $\varphi = \varphi(t)$ and solve equations (17) and (18) and then (19) in weak form using a finite element method using the software package FEniCS. We then solve (20) and move the fiber boundary correspondingly before finally interpolating the previous solution onto the new mesh. We then increase the time by $\Delta t$ and repeat this procedure.

The mesh is set up with the bore inlet at $z_i = \min(z)$ and $r_i \le 1$, no slip on the fiber surface, symmetry at $r=0$ and no diffusive flux at the other boundaries and subject to the initial condition $$c = 0 \text{ if } r \le 1 \text{ and } z \ge 0, \text{ or } r^2 + z^2 \le 1, \quad \text{(Eq. 24)}$$

$$c = 1 \text{ otherwise.}$$

Figure 7A:
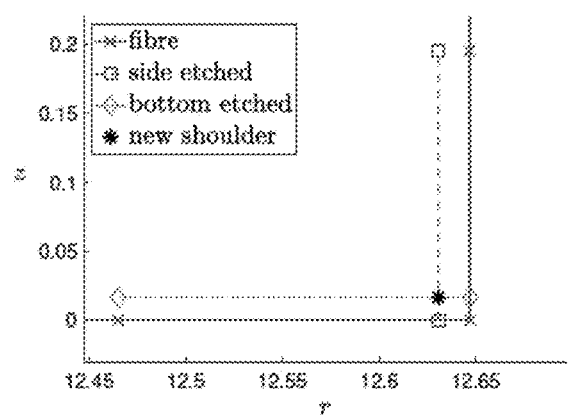
FIGS. 7A-B illustrate examples of the placement of the shoulder node.
Figure 7B:
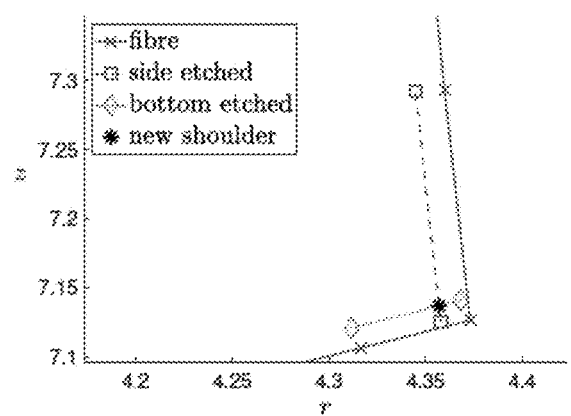

At each time step we move the nodes on the fiber boundary using (20). As the peak and shoulder nodes (as defined in Section 2 and shown in FIG. 6b) have no normal vector we calculate the new position of the edge connecting the corner nodes to their adjacent nodes using (20) and place the corner node at the point the new edges intersect. This process is shown in FIG. 7 for the shoulder node where the crosses represent the node positions and the solid line represents the joining edges before etching, the dashed/dotted lines represents the new positions of the edges connecting the shoulder node to the node adjacent on the fiber side/bottom, respectively, and the asterisk represents the new position of the shoulder node where the two new edges intersect. Nodes on the fiber bottom typically etch vertically more than they etch horizontally, whereas nodes on the fiber side typically etch horizontally more than they etch vertically, as can be seen in FIG. 7. This results in the corner nodes getting closer to the points either side of them and eventually wanting to pass these neighboring nodes. As a result, after the new positions for the nodes on the fiber surface are calculated, we redistribute them along the fiber maintaining their original separation ratios. In order to redistribute the points more accurately, we solve for a quadratic around each node and move the node along the curve found.

Figure 8:
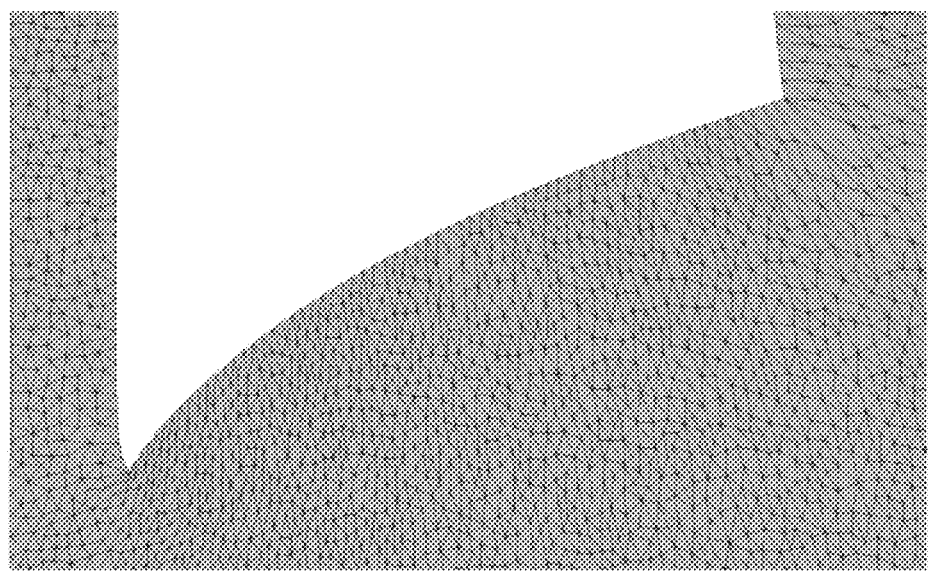
FIG. 8 illustrates the FEM mesh at t=5.

In order to avoid mesh distortion, we then redistribute all the other nodes on the mesh boundary by calculating the relative movement of the peak and shoulder nodes and compressing or stretching the node separation on the fiber boundary as required. Finally, we use FEniCS inbuilt automatic re-meshing class to redistribute the internal nodes. FIG. 8 shows an example of the mesh at t=5, although we can see there is some compression of the elements around the peak and some stretching of the elements around the shoulder, these effects are significantly reduced due to the steps described above.

We use (13) with $k_1$=7.639, $\alpha$=1.000, $k_2$=2.475, $\beta$=2.296, as given in below in conclusion, subsection A, for our etch rate and a fiber diameter of 125 μm with a 10 μm bore diameter. This gives a maximum etch rate of ER=26.548 and hence we will etch through to the bore after 36.098 minutes for which t=8.191. Thus, we will simulate up to t=8.

Figure 9A:
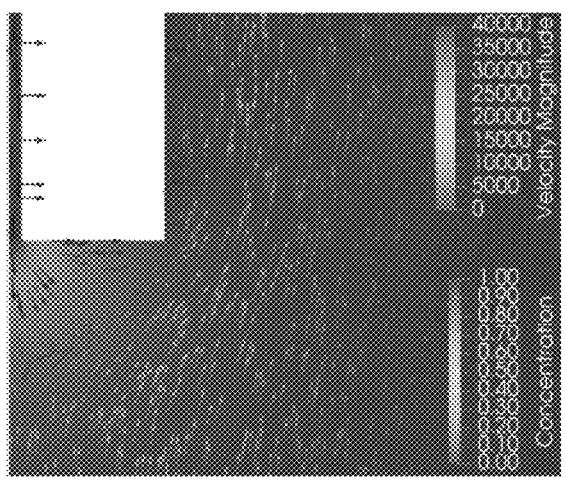
FIGS. 9A-B illustrate the capillary tube, concentration and velocity profiles for t=0 and 5.
Figure 9B:
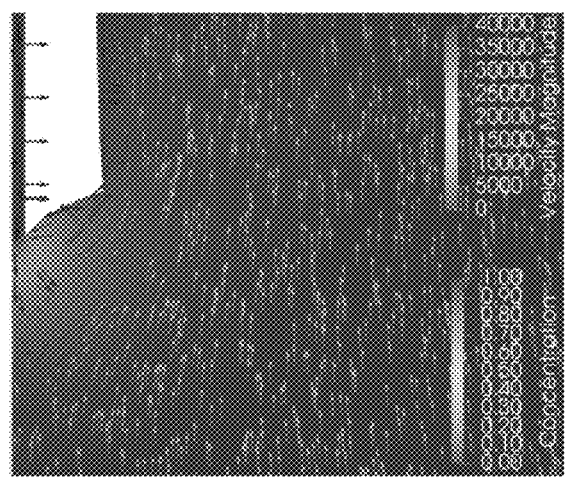

FIG. 9 shows the solutions at t=0, after the velocity and concentration equations have been solved, but before etching and at t=5 for Q=50. The color of the background is scaled with c and its color bar is shown in the bottom right of the figure, and the arrows point in the direction of the flow and are colored with the magnitude of u and its color bar is shown in the top right of the figure. Note that $U_c$=1.122×10$^6$, however scaling the velocity color bar to $U_c$ results in all the arrows outside of the bore being blue so we have limited the scale such that the difference in velocities throughout the acid is distinguishable. Further, the blue arrows pointing normal to the fiber surface may be ignored as they are due to numerical error producing flow velocities $O(10^{-11})$.

Figure 10:
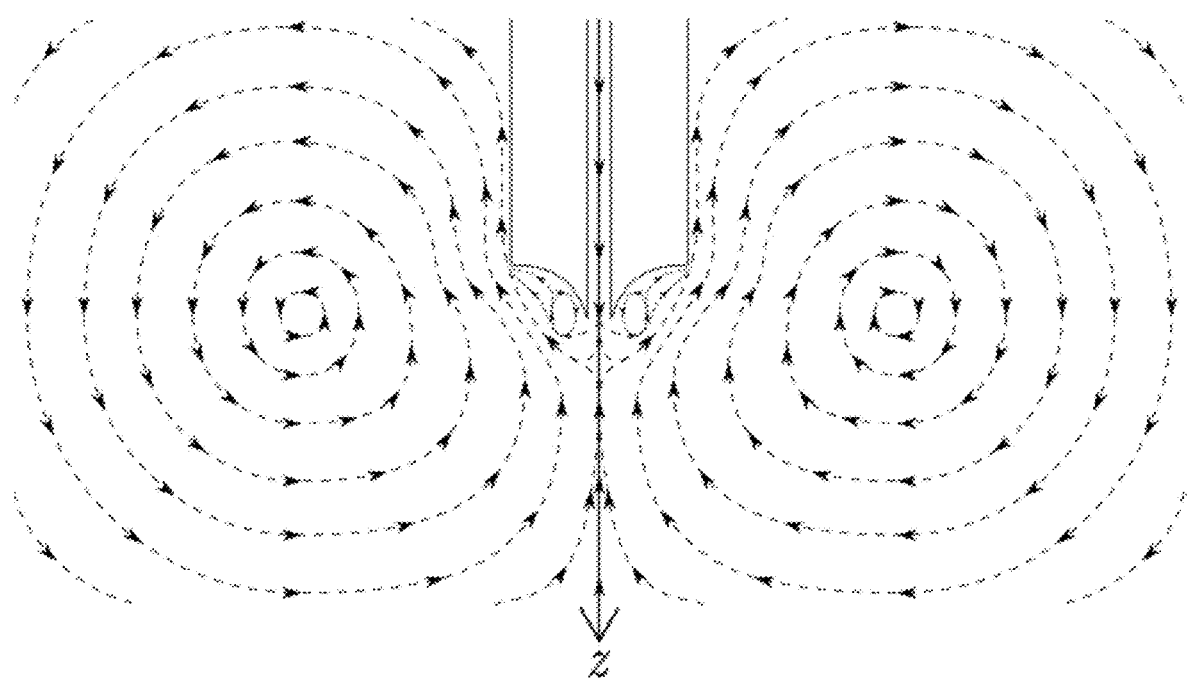
FIG. 10 is a schematic of the flow profile while etching.

We can see that the concentration of HF near the peak is very low and it increases as the distance from the peak is increased until we have close to 48% HF by weight far away from the peak. Due to the less concentrated acid being less dense this causes a buoyancy effect driving the flow upwards, this results in the 48% HF by weight far away (out of view in these figures) being pulled upwards and a flow circulation occurring. Focussing on the velocity near the peak we can see that the velocity of the water coming out of the bore is quickly slowed. By varying the flow rate we find it has little effect on the velocity profile, hence varying the flow rate only affects the quantity of water being added to the acid and hence causes a more diluted concentration profile across the fiber bottom. As the fiber etches and a sharper peak forms, as in FIG. 9b, we find a vortex forms just to the side of the peak and a higher concentration of HF along the fiber bottom to that in FIG. 9a and hence higher etch rate at later times. A schematic of the flow profile is shown in FIG. 10.

4. VARYING THE PARAMETERS

In order to improve our understanding of the etching process we will investigate the effects of varying our parameters. As the relation between diffusivity and concentration is not known, we will consider a constant value for diffusivity which we will vary and a large range of flow rates and investigate how they affect the system. As the fibers have a constant bore diameter in the range of 4 μm to 10 μm we will consider the effects of different bore diameters. Also, due to the production of $H_2SiF_6$ and $H_2O$ as the fiber is etched, a mixing region exists at the fiber surface and as a result our calculated etch rate parameters will vary depending on the diffusivity (the details of which are given below in conclusion, subsection B). A summary of the values for all the parameters and variables we will consider are given in Table 1.

TABLE 1

The values of the parameters and variables used.

| Parameter | Value | Units |
| --- | --- | --- |
| $\rho_a$ | 1.15 × 10$^3$ | kg/m$^3$ |
| $\rho_w$ | 1.00 × 10$^3$ | kg/m$^3$ |
| $\rho_s$ | 2.65 × 10$^3$ | kg/m$^3$ |
| $M_{HF}$ | 20.01 × 10$^{-3}$ | kg/mol |
| $M_s$ | 60.08 × 10$^{-3}$ | kg/mol |
| μ | 0.9 | mPa · s |
| $r_b$ | 2 → 5 | μm |
| R | 62.5 | μm |
| $k_1$ | 7.639 → 7.692 | nm/s |
| $k_2$ | 2.475 → 2.560 | — |
| α | 1.000 | — |
| β | 2.296 → 2.325 | — |
| Q | 1 → 200 | nL/min |
| D | 1 → 20 | nm$^2$/s |

Figure 11A:
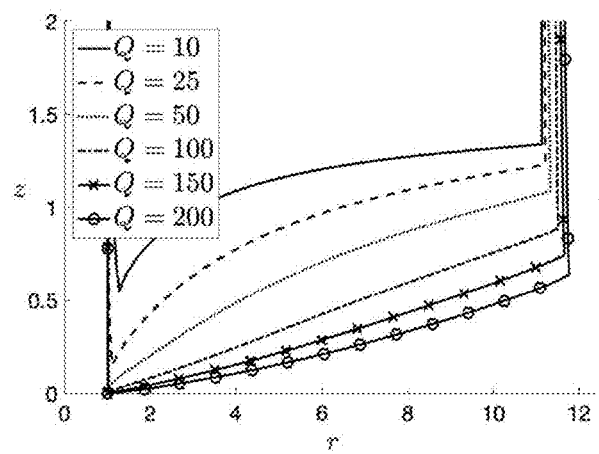
FIGS. 11A-B illustrate the effect of varying the flow rate for D=10.
Figure 11B:
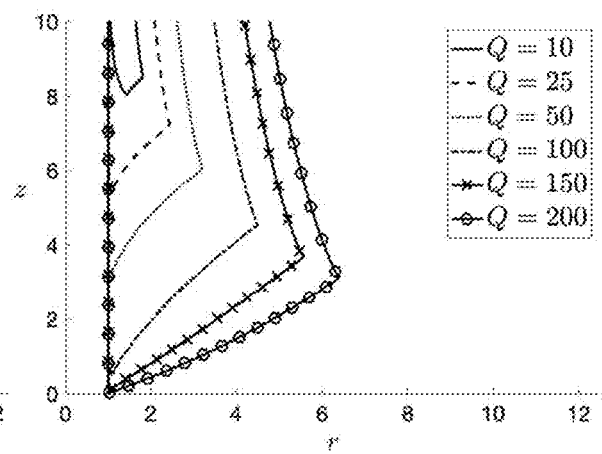
Figure 12A:
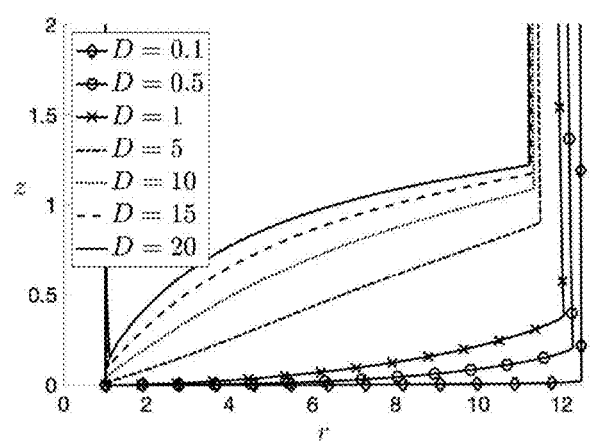
FIGS. 12A-B illustrate the effect of varying the diffusivity for Q=50.
Figure 12B:
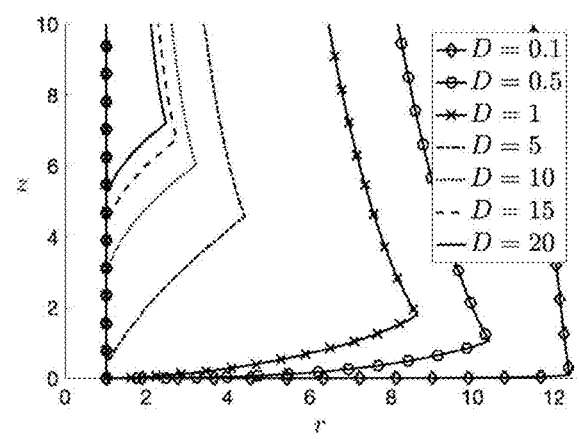
Figure 13:
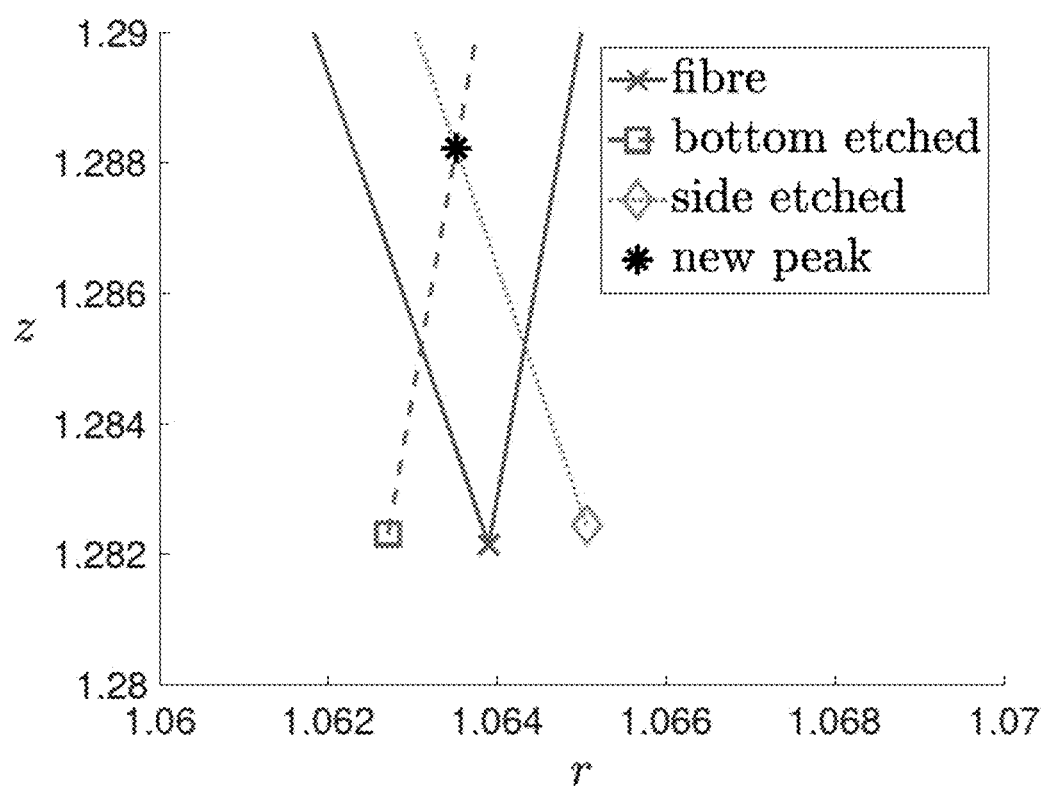
FIG. 13 illustrates etching at the peak due to the capillary tube tip becoming steep.

FIGS. 11 and 12 show the effects of varying the flow rate and the diffusivity, respectively. We can see that the effects of lowering the flow rate are very similar to the effects of increasing the diffusivity. This is due to both larger flow rates and lower diffusivity resulting in smaller concentration profiles around the fiber tip which cause the fiber to etch into a convex shape. Further, we can see that for the higher flow rates (Q≥100) and lower diffusivity (D≤1) the flow is able to counteract the diffusion around the bore outlet resulting in c≈0 here and hence we get very little etching at the peak. As the flow is decreased (Q≈50) or the diffusivity is increased (D≈5) the flow in through the bore is no longer able to counteract the diffusion and we get a low concentration at the peak which results in it etching upwards. However, the lower flow rate/higher diffusivity results in a larger concentration profile around the fiber and hence the fiber is etched more and creates a concave profile with, at later times, a sharp corner at the peak. The combination of the fiber becoming less wide and the peak becoming steeper increases the velocity profile around the peak and as a result a higher concentration here due to the increased advection of the water away from the peak. As the peak gets steeper it leaves only a thin wall between the bore and the fiber bottom which, coupled with the increased concentration here, etches the top of the peak off at an increasing rate resulting in the vertical location of the peak to move upwards quicker at later times, as demonstrated in FIG. 13.

As the flow rate is decreased (Q≈25) or the diffusivity is increased (D≈20) further these effects are further magnified—the concentration at the peak is slightly larger resulting in more etching here and the lower flow rate dilutes the acid less resulting in a larger concentration profile on the tip of the fiber and the fiber is etched more. Finally, as the flow rate is decreased (Q≈10) or the diffusivity is increased (D>20) the concentration at the peak is significantly larger which, although it results in a larger concentration profile on the tip of the fiber and hence more etching, also results in the peak concentration and shoulder concentration being closer together and a much less steep profile is created.

Figure 14:
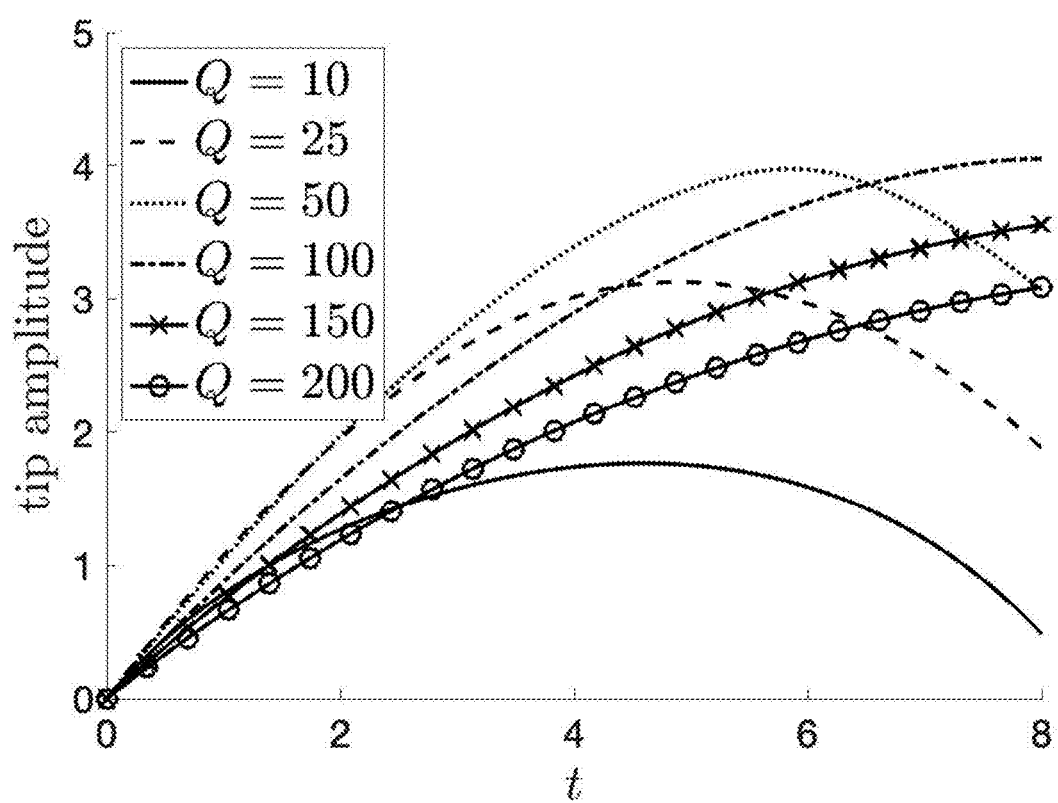
FIG. 14 illustrates the tip amplitudes for Q=10, 25, 50 and 100, 150 and 200.

As time is increased and the fiber tips for the lower flow rates and larger diffusivities become steeper and narrower, the velocity profile around the fiber peak is increased causing a larger concentration here due to the increased advection of the water away from the peak. Simultaneously, the narrowing of the fiber brings the shoulder r location closer to the peak and hence the concentration here decreases with time. As a result, initially the tip amplitude increases as the shoulder etches down more than the peak for all flow rates and diffusivities, however if the peak becomes steeper and the peak z location increases faster (as discussed above), although the concentration at the shoulder is higher the peak etches up quicker than the shoulder and the amplitude begins to decrease. This can be seen in FIG. 14 which shows the tip amplitudes which we define as the shoulder z location minus the peak z location.

Figure 15A:
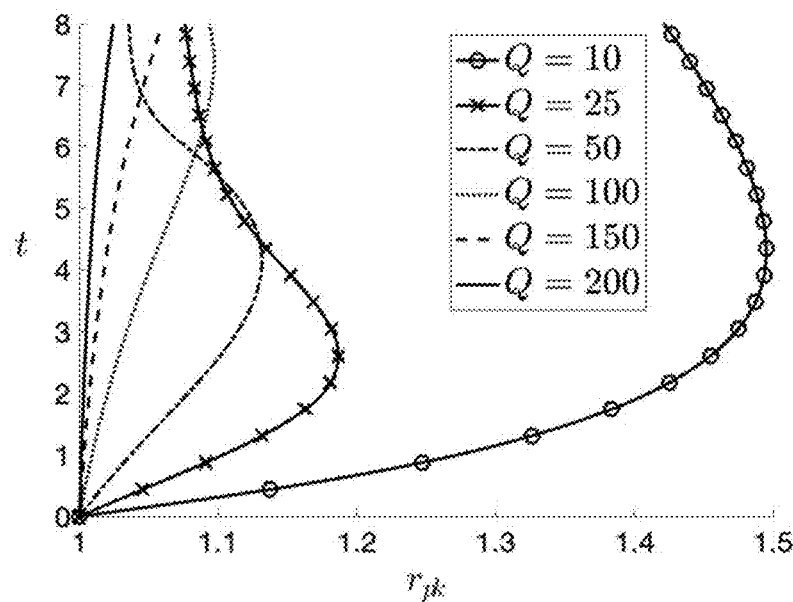
FIG. 15(a) illustrates the peak r location versus time.
Figure 15B:
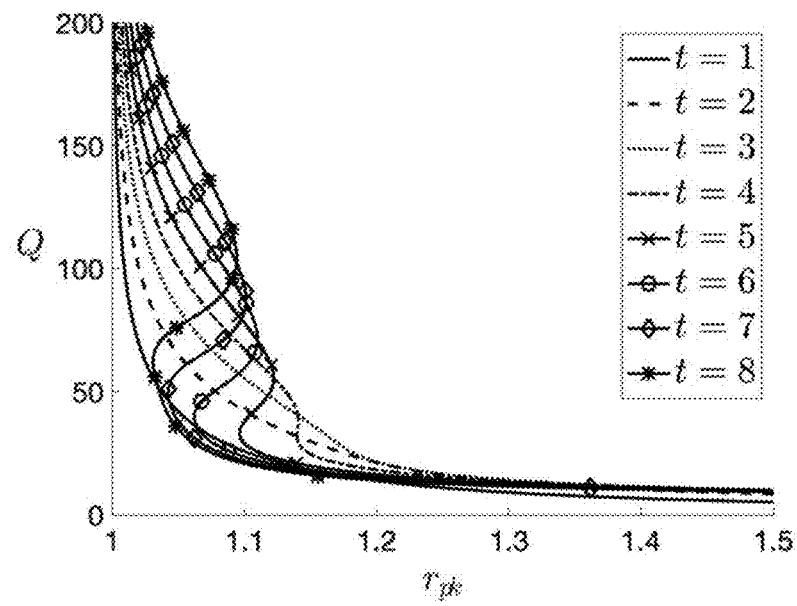
FIG. 15(b) illustrates the peak r location versus flow rate.

Due to the bore not being fully protected by the flow it not only etches down, but also etches out. For the higher flow rates and lower diffusivities this effect is very small, however as the flow rate decreases or diffusivity increases it becomes more significant due to the increase in concentration at the peak, for example Q=10 in FIG. 11b. However, if the peak then becomes steep, the higher concentration outside the bore begins to etch the peak location back towards its original position. FIG. 15 shows the peak r location against time for different flow rates in FIG. 15a and against flow rate at different times in FIG. 15b. We can see that for higher flow rates the peak is gradually being etched outwards for the duration of the simulation whilst for the lower flow rates, although they initially etch outwards they begin etching back inwards. The flow rates that have the largest concentration gradient on the tip, i.e. those that produce the steepest tips, are able to etch back inwards the most due to the larger concentration difference between the inside and outside of the bore.

Figure 16:
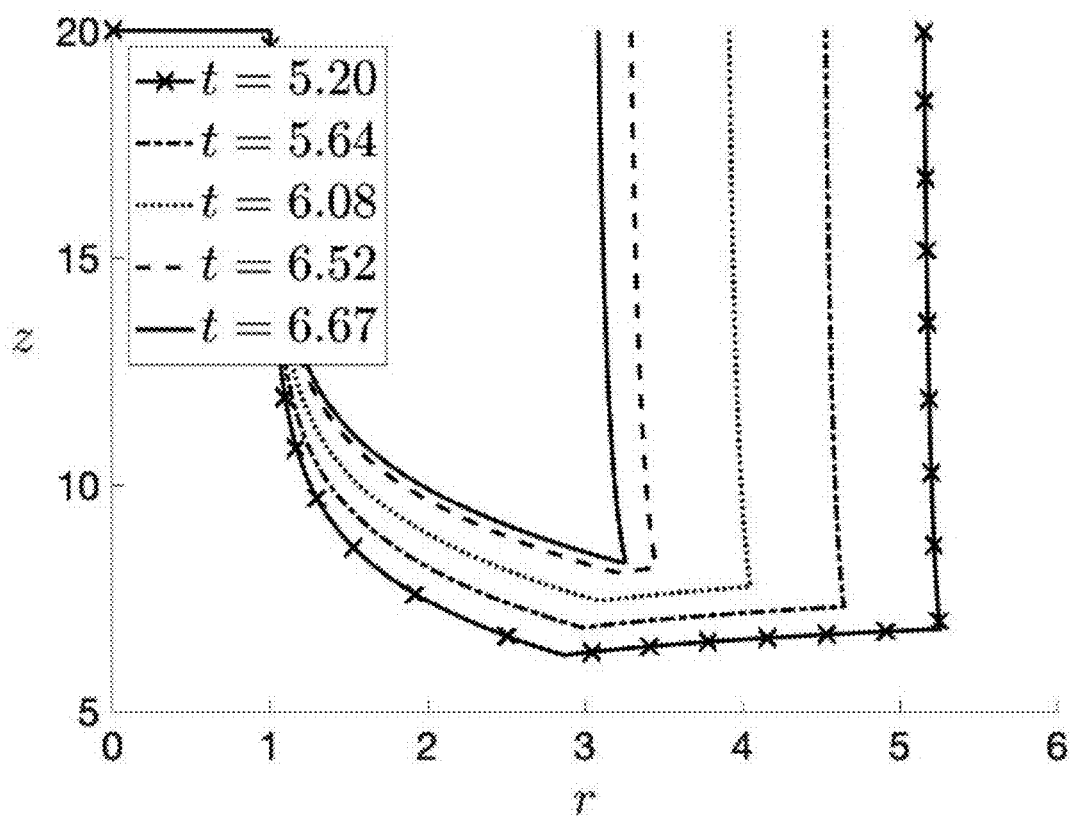
FIG. 16 illustrates the peak and shoulder joining for Q=5.

For even lower flow rates it is possible for the peak and shoulder to join. An example is shown in FIG. 16 for Q=5. We can see the low flow rate has resulted in significantly more outward etching of the peak position compared to the examples we examined earlier due to a higher concentration at the peak. As the concentration difference between the peak and the shoulder is relatively low we do not get a steep fiber tip and so the peak position does not begin to etch back inwards at later times as we saw previously. Eventually, the peak and shoulder positions merge which causes our numerical method to fail due to elements becoming infinitesimal. However, we would expect the fiber side to continue etching inwards resulting in the peak-shoulder point to also move inwards resulting in a final very slender fiber whose bore opens at the outlet joining the fiber side.

Figure 17:
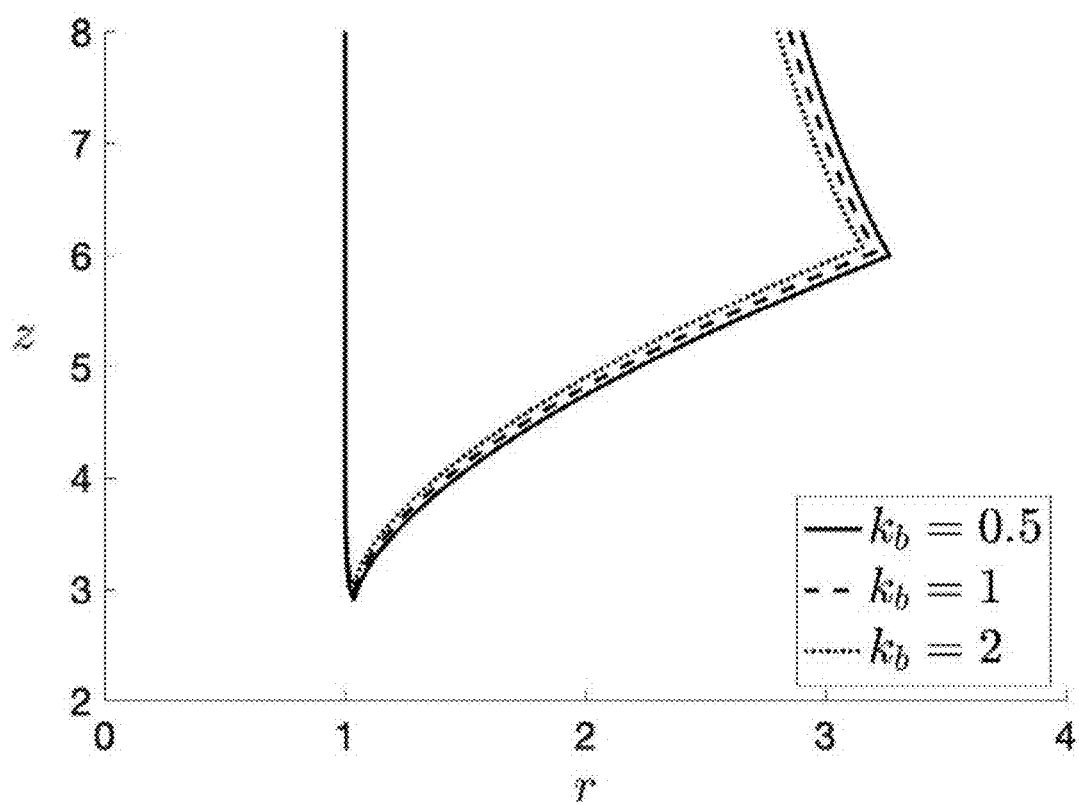
FIG. 17 illustrates the effect of varying the buoyancy for Q=50 at t=8.

In order to investigate the effects of varying the buoyancy force we replace $B_c$ with $k_b B_c$ for a constant $k_b \geq 0$. Varying $k_b$ corresponds to varying $\rho_a-\rho_w$, hence decreasing $k_b$ corresponds to the the densities of HF and water being closer and increasing $k_b$ corresponds to there being a greater density difference between HF and water. We find that increasing $k_b$ results in more etching occurring, however the effects are very small, as shown in FIG. 17. The flow profile in the acid is very weak and is dominated by the buoyancy, however halving or doubling the buoyancy force has very little effect on the system as the size of the buoyancy force is not important as long as it is large enough to dominate the force of the flow exiting the bore.

Figure 18:
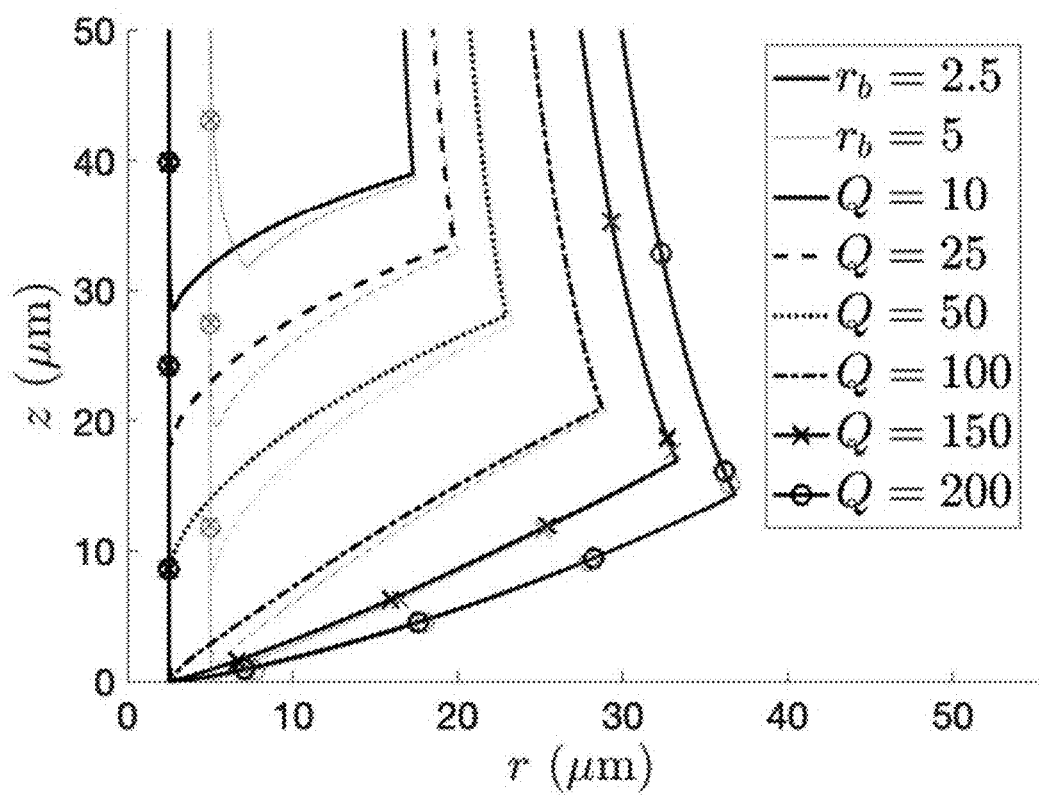
FIG. 18 illustrates the capillary tube profiles for rb=2.5 and 5 after 30 minutes.
Figure 19:
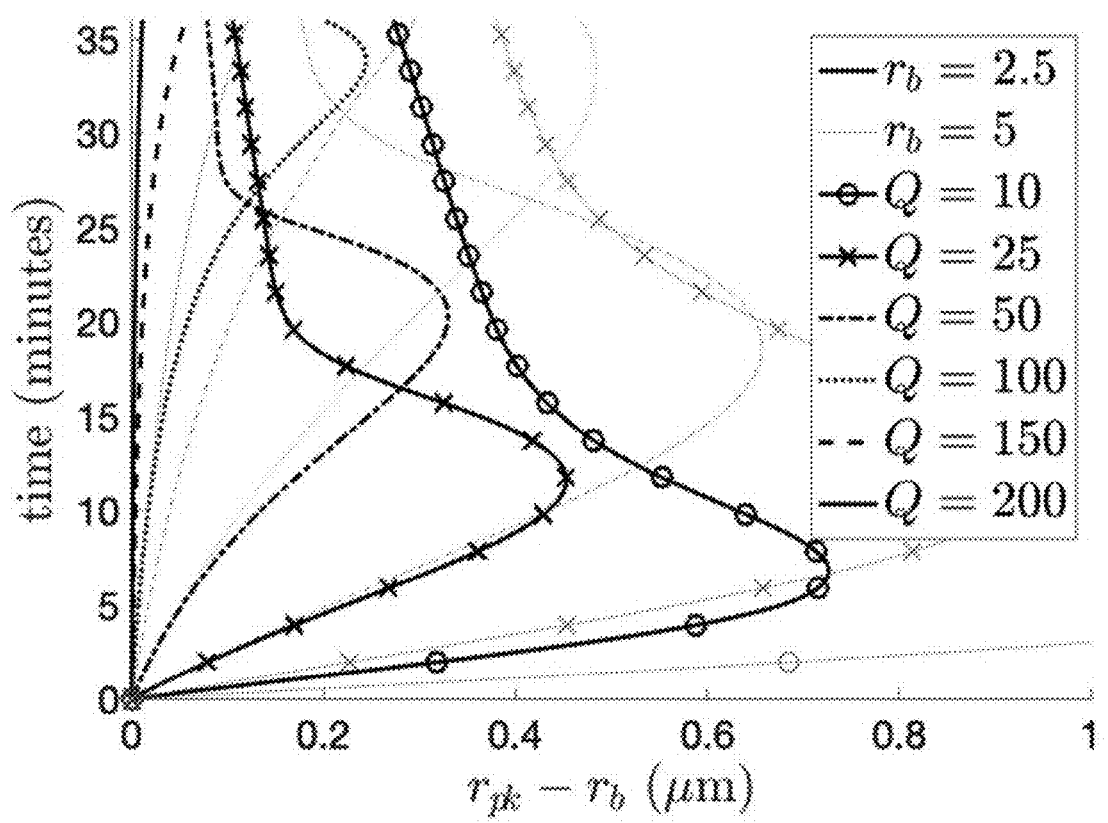
FIG. 19 illustrates the rpk displacement versus time comparing rb=2:5 and rb=5.

This is further demonstrated by considering changes to $r_b$. Decreasing $r_b$ results in a faster flow through the bore and hence results in a lower concentration profile at the peak and less etching here, however has a very small effect at the shoulder. We can see from FIG. 18 that the general shape of the fiber tips for $r_b$=2.5 μm and $r_b$=5 μm are very similar and there is no significant change in the etched fiber width. FIG. 19 shows the $r_{pk}$ displacement for $r_b$=2.5 μm and $r_b$=5 μm. We can see a significant reduction in the outward etching of the bore which quickly etches back inwards due to the sharper peaks formed for the smaller bore diameter.

Throughout our investigation into the parameters of our system we have found that the system is stable for changes to the parameters other than the diffusivity and flow rate. These parameters are the only ones which effect the concentration profile which has a profound impact on the final etched profile. Higher diffusivity or lower flow rate creates a stronger concentration profile along the fiber bottom and sharp peaks, however very low flow rates or very high diffusivity results in a smaller concentration gradient and less sharp peaks. Hence, in order to control the geometry of the fiber tip, the flow rate and diffusivity must be such that it creates a concentration profile with both the required strength and gradient.

5. EXPERIMENTAL DATA ANALYSIS

Experiments were carried out using fibers with an outer diameter of 120 μm to 130 μm and internal diameter of 10 μm. The fibers were dipped into 48% by weight hydrofluoric acid to a depth of 2 cm such that they were perpendicular to the surface and in the center of the test tube and left there for 10, 15, 25, 30 and 32.5 minutes. After the allotted time in the acid had been reached the fibers were removed from the acid and dipped into a test tube of water in order to wash any remaining acid off the fiber surface. Whilst in the acid, water was pumped through the fiber bore with flow rates of 25, 50 and 100 nL/min, where 25 nL/min was found to be the minimum flow rate possible for which the pump used could provide a consistent flow due to the low pressure required at lower flow rates. Each combination of time and flow rate was completed in triplicate to demonstrate consistency.

Figure 20A:
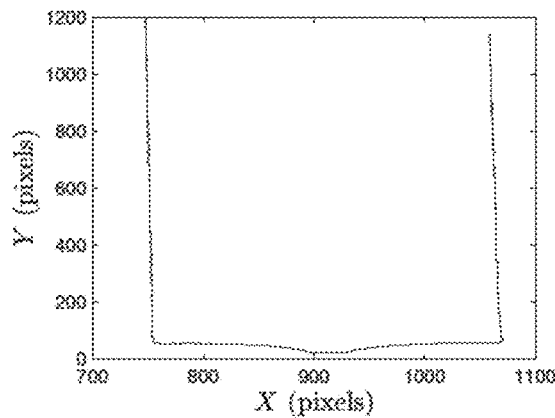
FIGS. 20A-D illustrate the profile for Q=25 after a 15 minute etch with (a) original, (b) rotated, (c) normalized (d) converted to µm.
Figure 20B:
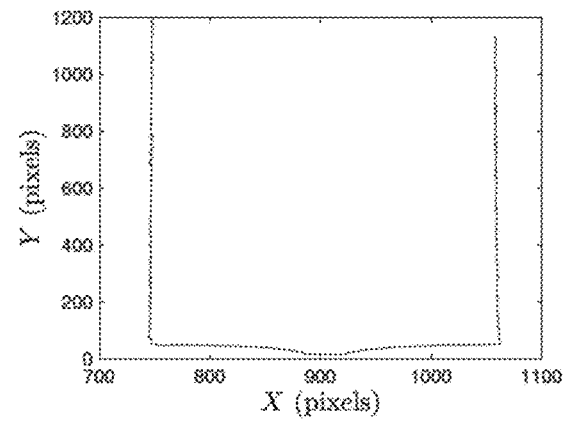
Figure 20C:
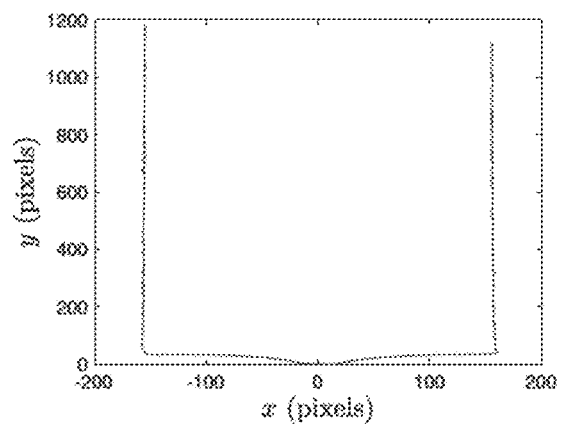
Figure 20D:
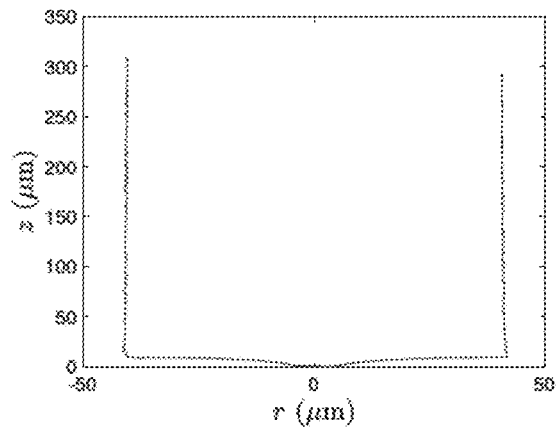

After being etched, pictures of the fibers were taken under an optical microscope and imported into ImageJ and (X, Y) coordinates in pixels found for the outline of the fiber, as shown in FIG. 20a. This data was then rotated until the fiber was straight by finding the center of the fiber at points far away from the fiber bottom and aligning those center points. This is shown in FIG. 20b where we find the center points at Y=800, 900, 1000 and 1100 align at X=902.5 when rotated at 0.007 radian. This profile is then normalized such that its center in X lies on x=0 and the bore outlet lies at y=0, as shown in FIG. 20c, before finally being converted from pixels into μm, as shown in FIG. 20d.

Figure 21A:
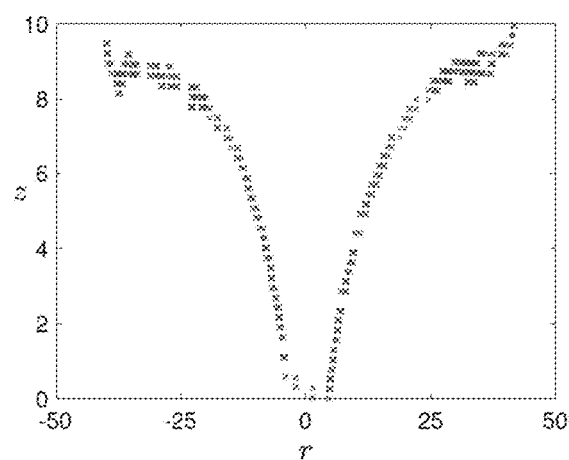
FIGS. 21A-B illustrates the fiber tip profile for Q=25 after a 15 minute etch.

By removing points along the fiber side we find the profile of the etched fiber tip, as shown in FIG. 21a, from which we can see asymmetry in the profile. This is most likely caused by the fiber not being perfectly perpendicular to the acid surface and hence one side of the fiber bottom being slightly higher than the other. As a result, the buoyancy effects cause more advection on the higher side creating a more dilute concentration profile and hence less etching on the higher side. If we rotate the data further we find we are able to find very symmetric profiles, however when this angle is used on the full profile it is clear the fiber is not straight. Hence, we believe to get the most accurate profile of the fiber tip we must use the asymmetric profile and consider each side separately and aim to find a fit which gives a good match to both profiles.

Figure 21B:
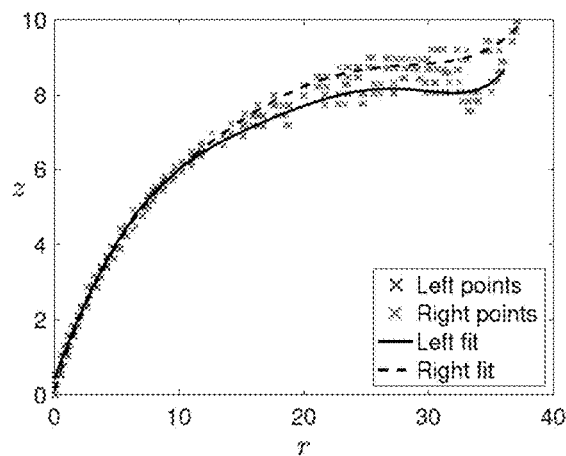
Figure 22A:
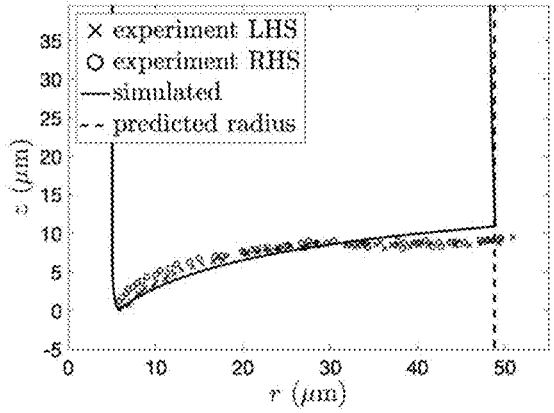
FIGS. 22A-F illustrate the simulated capillary tip profiles, the left and right best fit equations for the capillary tip from the experiments and the predicted radius after a 10 and 30 minute etch for D=9 with (a) Q=25, 10 minutes, (b) Q=25, 30 minutes, (c) Q=50, 10 minutes, (d) Q=50, 30 minutes, (e) Q=100, 10 minutes, (f) Q=100, 30 minutes.
Figure 22B:
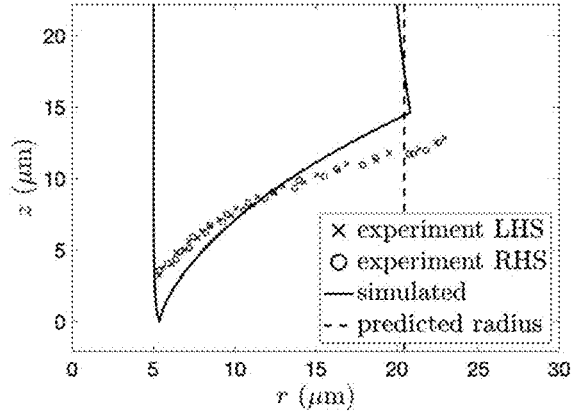
Figure 22C:
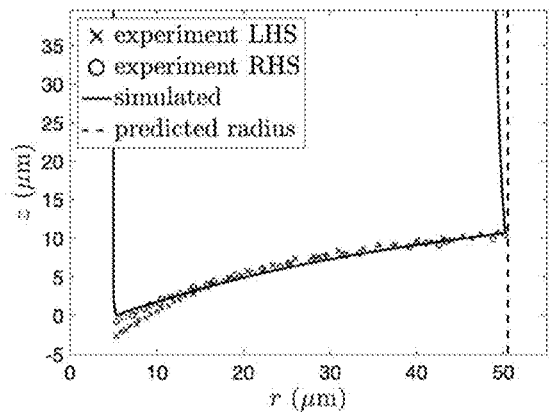
Figure 22D:
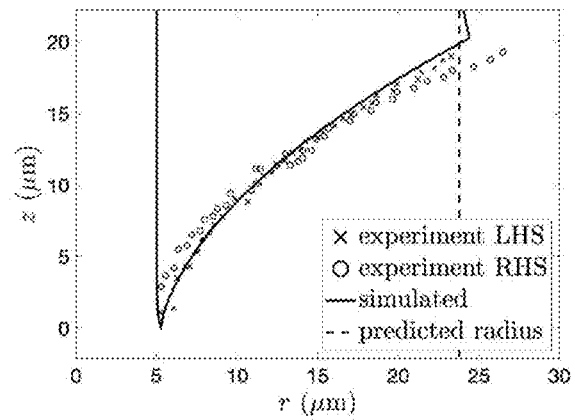
Figure 22E:
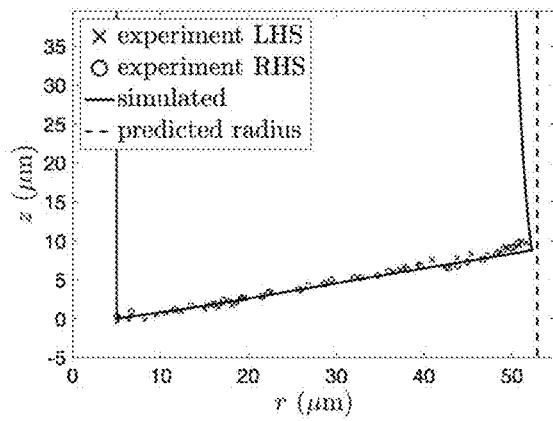
Figure 22F:
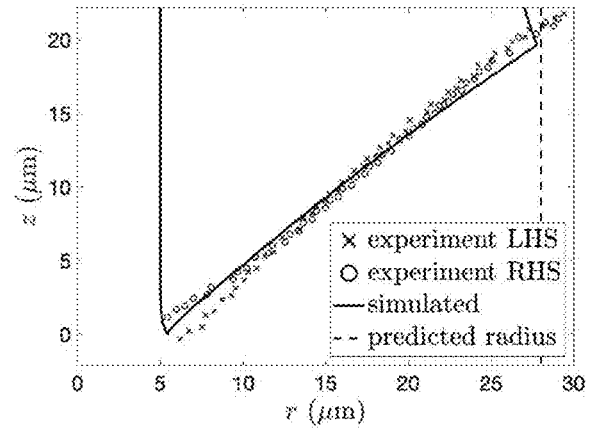

The imaging process picks up points along the front and back of the fiber where the bore outlet is, hence we remove these data points leaving only the points corresponding to the sides of the fiber tip. Next we normalize the data such that the points on the fiber tip next to the bore outlet are located at the origin and take the absolute value of r. We then find a $6^{th}$ order polynomial equation which gives a best fit to each of the two sets of data. This is shown in FIG. 21b where the blue and red points correspond to the left and right side of the fiber tip, respectively, and the solid and dashed lines are the best fit lines for the left and right side of the fiber tip, respectively. Finally, we record the value of max(r) for the left and right points which we denote $R_{i\_max}$ where i=L, R for the left and right data sets, respectively.

For comparison to our simulated data we write the best fit equations as $z_i=z(r-r_{pk}-b, z_0)$, b is a constant and $z_0$ is a constant added to the end of the equation. For superscript s denoting the simulated values—if $r_{sh}^s-r_{pk}^s>R_{i\_max}$ we set $0<b_i<r_{sh}^s-r_{pk}^s-R_{i\_max}$, otherwise we set $r_{sh}^s-r_{pk}^s-R_{i\_max}<b_i<0$. This ensures that we will be comparing either the entire simulated fiber bottom or the entire experimental fiber bottom, whichever is smaller, whilst allowing some lateral movement in the comparison of the profiles. We then set $r_{i\_min}=\max(r_{pk}^s, r_{pk}^s+b_i)$ and $r_{i\_max}=\min(r_{sh}^s, r_{pk}^s+R_{i\_max}+b_i)$. We then denote $r_i^s$ to be the r values of the nodes on our simulated fiber tip that satisfy $r_{i\_min}<r<r_{i\_max}$ and $z_i^s$ to be their respective z values from our simulations and $z_i^e$ to be their respective z values from the left and right best fit polynomials, i.e. $z_i^e=z_i(r_i^s-r_{pk}-b_i, z_0)$. We then use a least the sum of the squares algorithm to find the values for $b_i$ and $z_{i\_0}$ which give the best fit between $z_i^s$ and $z_i^e$ and use those values to define the fit to be the average of the square of the distance between $z_i^s$ and $z_i^e$. Finally, we take the average of the left and right fit values which we define as the Curve Fit value and repeat this process for each of the 10, 15, 25, 30 and 32.5 minute experiments and for each value of diffusivity.

The diameters of the fibers were measured before and after etching and the average change for each combination of flow rate and time found. The mean diameter before etching was 126.47 µm, hence we used R=63.235 µm for our simulations and define the predicted radius after etching to be 63.235 µm minus the average radial change for that flow rate and time. We then define the Width Fit to be square of the difference between $r_sh$ and the predicted radius for each of the 10, 15, 25, 30 and 32.5 minute experiments and for each value of diffusivity.

As the Curve Fit is calculated from where the simulated and experimental profiles overlap and does not take into account the Width Fit, it gives an unreliable measure of the fit if considered independently. As the most important factor in the performance of emitter tips is their width, we will focus on our Width Fit values in order to determine the diffusivity. We find the smallest combined average Width Fit and standard deviation for D=9 for which we get a very good Curve Fit for Q=50 and 100, however slightly less so for Q=25. For Q=25 and D=9 we find that the concentration around the peak is lower than required so less etching occurs here and a less sharp, larger amplitude fiber tip is etched than found in the experiments. A comparison of the simulated profiles for D=9 against those found experimentally and the predicted radius at the shoulder is shown in FIG. 22. We can see the simulated profiles match the experimental profiles well and the error is on the same order as the difference found between the left and right hand side experimental profiles. This suggests that our model is accurately modelling the etching process and a constant diffusivity of D=9 gives a sufficiently accurate fit.

6. CONCENTRATION DEPENDENT DIFFUSIVITY

Although we have demonstrate that assuming the diffusivity to be constant is sufficient in order to find a good match between the experimental data and our simulated profiles, it is clear when considering the Width Fit for our flow rates individually each flow rate has a different optimal diffusivity for the best fit, whereby the optimal diffusivity decreases with increases to the flow rate (D=13, 11 and 8 for Q=25, 50 and 100, respectively). Further, for all flow rates a more accurate match around the peak, where the concentration is lower, is found for a higher diffusivity than that for the optimal Width Fit. This suggests that a concentration dependent diffusivity whereby the diffusivity is larger for lower concentrations would result in a better fit between our simulated profiles and the experiments, particularly for Q=25 as the resulting higher concentration around the peak would cause more etching here and create a less steep profile on the fiber tip.

Figure 23:
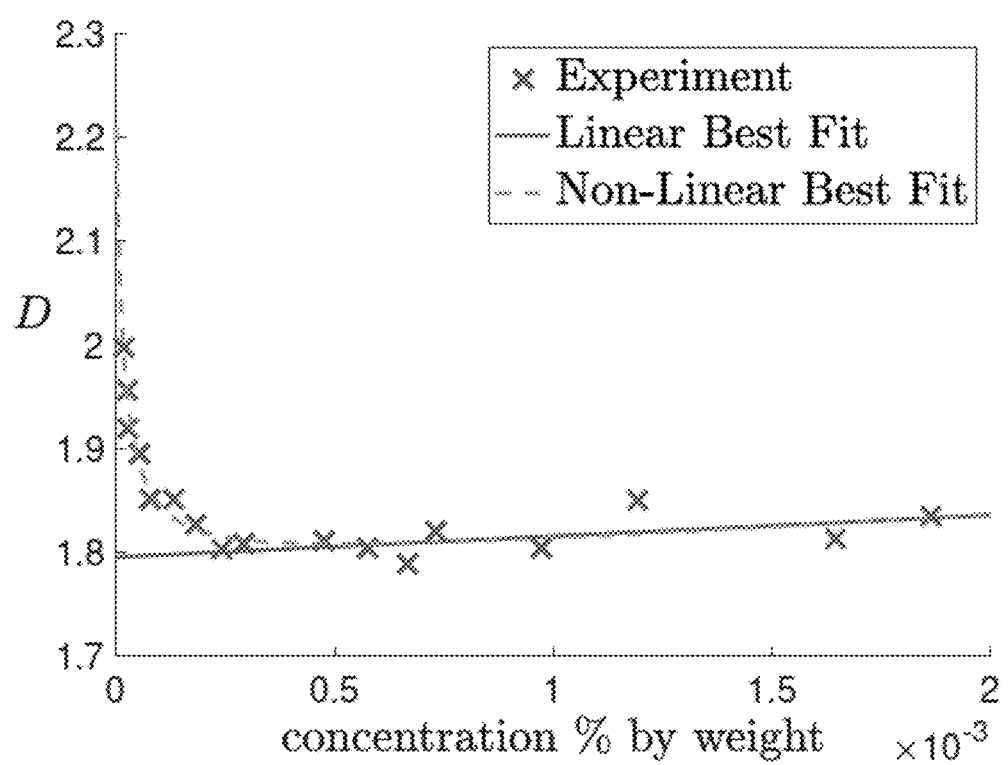
FIG. 23 is the experimental data of Noulty and Leaist [1985] and the linear and non-linear best fit lines for the concentration dependent diffusivity.

The experiments of Noulty and Leaist [1985] for the diffusivity of HF at concentrations of 0.002% to 0.2% HF by weight, as discussed in Section 1, found a minimum value of 1.803 nm$^2$/s and maximum of 1.997 nm$^2$/s. Although they found an initial sharp decrease in diffusivity as the concentration increased, from 0.003% to 0.2% HF by weight they found a slight increase in diffusivity as the concentration increased. We can find a linear best fit of the form $D_l=a_1 c+a_2$ for the data corresponding to concentrations from 0.003% to 0.2% HF by weight and a non-linear best fit of the form $D_n=b_1 c+b_2+b_3/(b_4+c)$ for all the data. These best fit lines and the data of Noulty and Leaist [1985] are shown in FIG. 23.

They attempted to measure the diffusivity at concentrations greater than 0.2% HF by weight, however found that due to bubbles of HF vapor forming they were unable to take measurements. If we assume the correlation for this data holds for all concentrations of HF we find the linear best fit gives $D_l(0.48)=11.477$ and the non-linear best fit gives $D_n(0.48)=14.118$. Although these values fit much better with our simulated results for a constant diffusivity, when the equations for $D_l$ and $D_n$ are used in the simulations we find a very poor fit to the fiber tip geometry. This suggests the relationship between the diffusivity and the concentration is significantly more complex and requires more data on the diffusivity of HF at higher concentrations.

Further, it may well be necessary to take into account the different components of hydrofluoric acid into account and develop a multi-species model for which each component has its own diffusivity and affect on the etch rate. Many authors have investigated the effects each component of the HF mixture has during the etching process in order to better understand it. Reaction schemes for $SiO_2$ with low concentration hydrofluoric acid have been developed and the equilibrium coefficients found experimentally. However, for higher concentration mixtures where the higher polymeric $H_2F_3^-$ and $H_3F_4^-$ ions exist, the equilibria relations and coefficients are unknown. As a result, a multi-species model for the etching of $SiO_2$ with hydrofluoric acid is not possible at this time.

7. CONCLUSION

We developed a model for the process of wet chemical etching of single bore microstructured silicon dioxide fibers in hydrofluoric acid whilst water is pumped through a bore running through its center. Through numerical simulation we found that the flow rate and diffusivity have significant affects on the system as it is these parameters which dictate the concentration profile of the acid on the fiber boundary. Further, we found that the water through the bore does not fully protect it and the peak is etched outwards, particularly for lower flow rates. As it is the lower flow rates which result in narrower fiber tips which is desired for the production of emitter tips for electrospray ionization mass spectrometry, we found that using a smaller bore radius reduces this effect significantly. By comparing our simulated results with those from experiments we demonstrated the accuracy of our model for a constant diffusivity of 9 nm$^2$/s, however found that a concentration dependent diffusivity may improve the accuracy further. We investigated the effects of a concentration diffusivity, however due to a lack of experimental data on the diffusivity for hydrofluoric acid at concentrations above 0.2% HF by weight and the complex formation of higher order polymeric ions an accurate concentration dependent diffusivity profile has not been found and is an area requiring further research.

A natural continuation of this work would be to consider multi-bore microstructured fibers. Although this requires a three dimensional model, as long as the bores were distributed symmetrically a model similar to the one used here for a three dimensional wedge may be used. This is an area of ongoing research.

A. Etch Rate Calculations

Many authors have studied the relation between HF concentration and the etch rate of SiO$_2$ (a summary of reported etch rates against concentration is given by Speirings [1993], however the exact dynamics and the precise etch rate is still an area far from being understood. We performed no-flow experiments, whereby fibers were placed in concentration strengths of HF for different amounts of time and the fiber diameters measured in order to calculate an etch rate for each strength of HF. We then found values for $k_1$, $\alpha$, $k_2$, $\beta$ such that the equation given in (13) gave a best fit to our data.

The experiments were run using fibers approximately 350 μm in diameter with coating, which were stripped of the coating and measured before etching. Pure HF was diluted with water in ratios of 25%, 50%, 75% and 100 by volume and the fibers were then left in the different concentrations of HF for 5, 10, 15 and 30 minutes with each combination of HF concentration and time repeated three times. The measured diameter after the etch was subtracted from the initial diameter and halved to give the radial amount etched, then this value was averaged for the three repeated experiments. Table 2 shows the average etch rate for each HF concentration at each time (which fit well with values in the literature). The measurement process has a 1.5 μm potential error for each measurement, hence each calculated amount etched from the diameter has a potential 1.5 μm error for the radial amount etched. As a result the data for the lower concentrations and shorter times is somewhat unreliable.

TABLE 2

The average etch rates in nm/s varying time and HF concentration.

| c | 5 min | 10 min | 15 min | 30 min | Average |
|---|---|---|---|---|---|
| 0.25 | 2.618 | 2.545 | 2.278 | 1.576 | 2.254 |
| 0.5 | 5.090 | 6.617 | 5.575 | 5.017 | 5.575 |
| 0.75 | 15.125 | 11.562 | 12.944 | 12.944 | 13.144 |
| 1 | 27.923 | 25.960 | 26.275 | 25.960 | 26.529 |

In order to find a best fit for the parameters in (13) to our experimental data we use a least the sum of the squares algorithm. This gives a value of $\alpha<1$ which gives the etch rate a very steep gradient as the concentration is increased from zero which does not match experimental data using low concentrations. It has been shown for low concentrations the relationship between concentration and etch rate is close to linear, as such we set a lower bound on $\alpha$ of 1 which then gives a best fit for (13) to our experimental data for $$k_1=7.639,\ \alpha=1.000,\ k_2=2.475,\ \beta=2.296. \qquad \text{(Eq. 25)}$$

Figure 24:
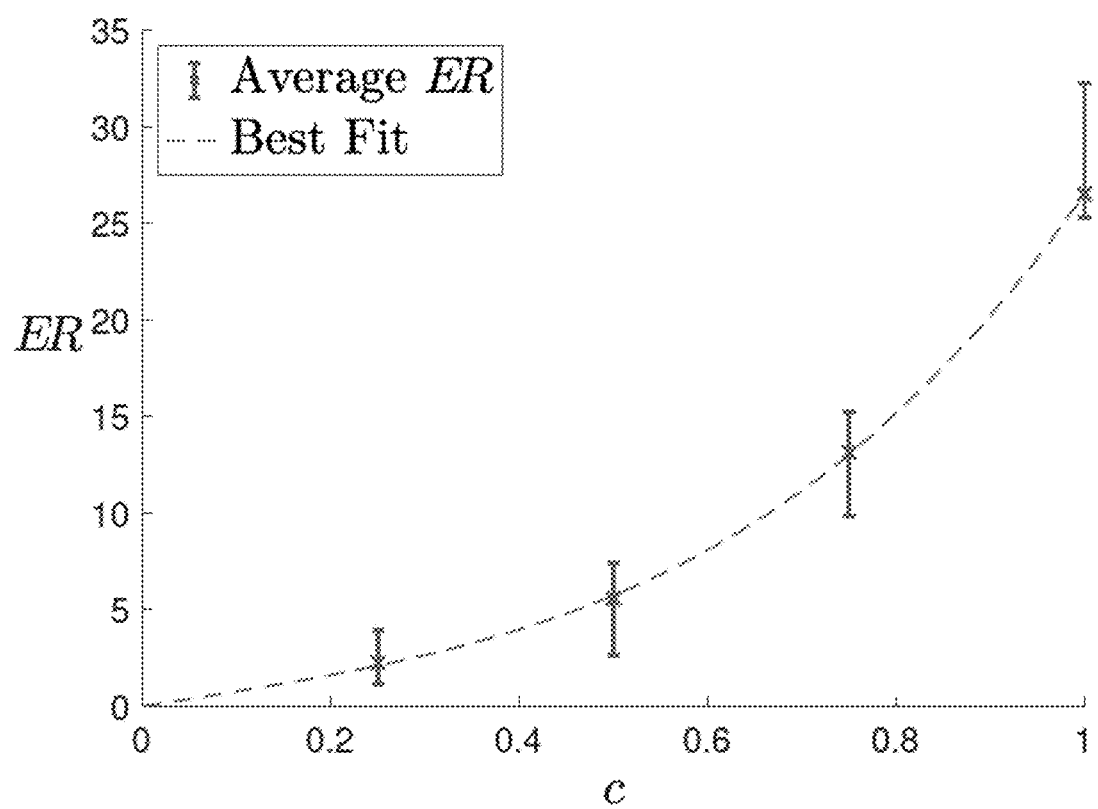
FIG. 24 is the average etch rates (nm/s) with the maximum and minimum values and the best fit line for (13)

FIG. 24 shows a plot of the average etch rates given in the final column of Table 2 with the maximum and minimum values and the best fit parameters from (25) used in (13) represented by the dashed line.

B. The Fiber Flux Effects on the Etch Rate

We found our best fit equation for the etch rate based on the base concentrations used in the experiments discussed below in conclusion in subsection A, however as the fiber is etched the 'used up' HF and etched SiO$_2$ dilute the HF. Although this has a negligible affect globally, it creates a mixing region locally by the fiber as the 'used up' HF and etched SiO$_2$ diffuse into the HF. Hence, the surface concentration on the fiber will be lower than that of the base concentration and is dependent on the diffusivity. In order to set a value for the diffusivity we will simulate using a range of diffusivities and compare our results with those found experimentally and chose the value which gives us the best fit. As such, in order to more accurately match the experimental results, we first simulate a 350 μm fiber without flow for the same values of diffusivity in order to calculate the surface concentration. We then find the parameters for (13) which give the best fit for each value of the diffusivity which we will then use for simulating and comparing to the experimental results.

In order to simulate these 'no-flow' experiments we must non-dimensionalize without using $k_1$ and $k_2$ as these values are unknown to us now. As such, as we know the maximum etch rate is close to 25 nm/s we choose to non-dimensionalize with $E_m=25$ nm/s and, as previously, set $r_b=5$ μm. As a result, we now have the scales $$u=E_m u',\ t=r_b t'/E_m,\ p=\mu E_m p'/r_b, \qquad \text{(Eq. 26)}$$

and dimensionless parameters $$B_c=-g\,r_b^2(\rho_a-\rho_w)/(\mu E_m),\ D_c(c)=D(c)/(E_m r_b). \qquad \text{(Eq. 27)}$$

The equations remain the same, except now $$dr_f/dt=E_e/E_m, \qquad \text{(Eq. 28)}$$

where $E_e$ is the etch rate calculated from the experiment we are simulating and our 5, 10, 15 and 30 minute experiments correspond to t=1.5, 3, 4.5 and 9, respectively.

Figure 25A:
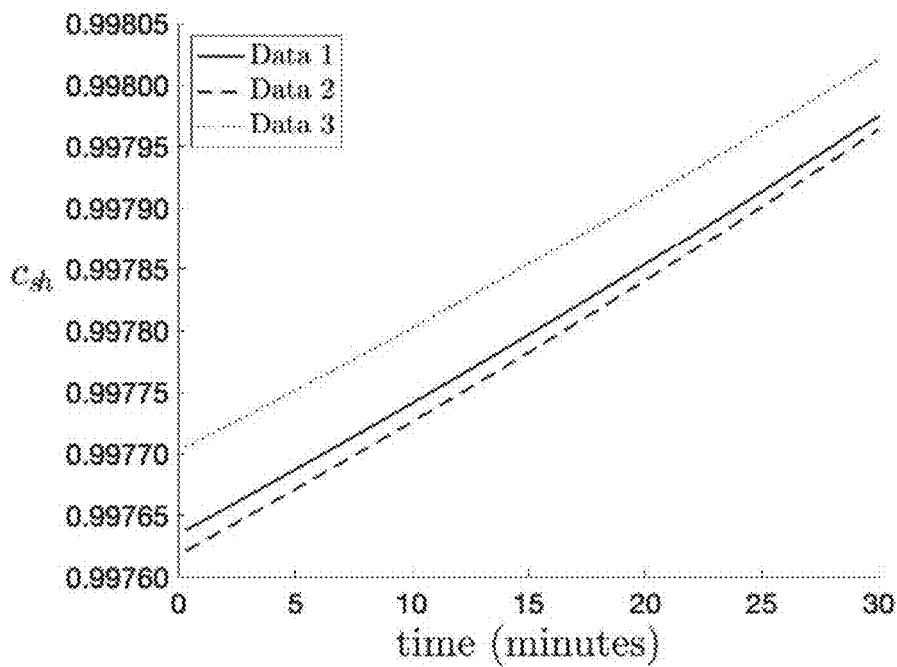
FIGS. 25A-B illustrate a concentration profile and the shoulder concentrations for the three c=1, 30 minute experiments with (a) the concentration profile at t=9 for one experiment; and (b) the concentrations at the shoulder for the three 30 minute experiments.

We find, as shown in FIG. 25a, the concentration profile is not uniform along the entire fiber boundary. This is due to the flow from the buoyancy being higher nearer the shoulder than the peak and hence greater affects from advection there causing a slight increase to the concentration. As a result we would not expect the etch rate to be identical along the entire fiber boundary and the peak would etch slightly less causing a slight change in the fiber geometry. This is turn would affect the flow profile and effect the surface concentration at the shoulder. However, we do not have measurements for any point other than the change in the fiber width at the shoulder, hence cannot take these effects into account.

Figure 25B:
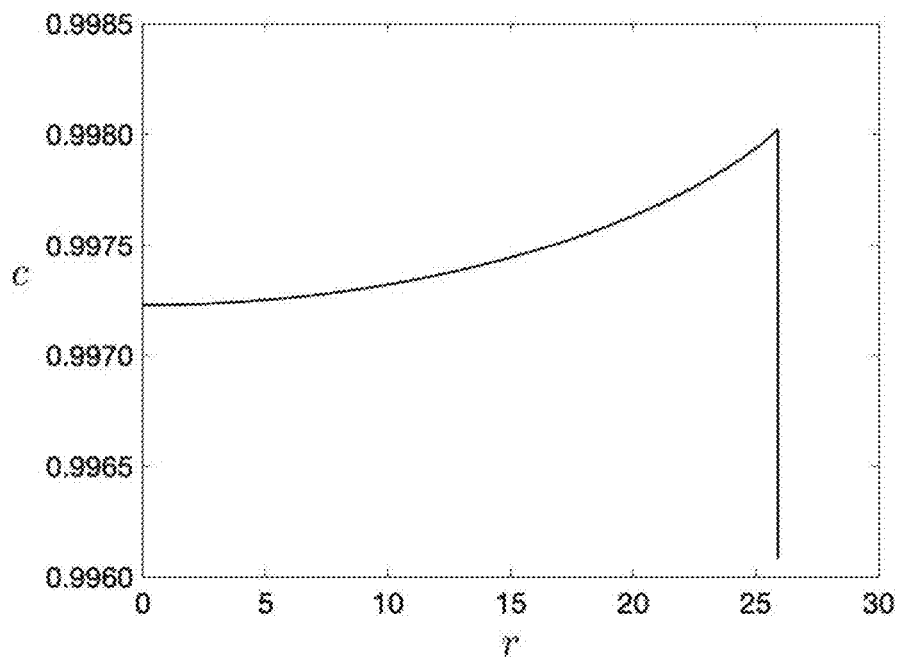

Over the duration of the no-flow experiments, due to the fiber becoming less wide throughout, the magnitude of the flow around the fiber boundary increases. This results in more effects from the advection and a higher surface concentration, as shown in FIG. 25b, and hence a larger etch rate at later times. Similarly to the above, as we do not have measurements throughout the experiments, only the overall change in fiber width at the shoulder.

Figure 26A:
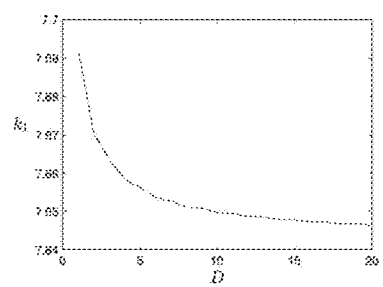
FIGS. 26A-C illustrate how the etch rate parameters vary with diffusivity.
Figure 26B:
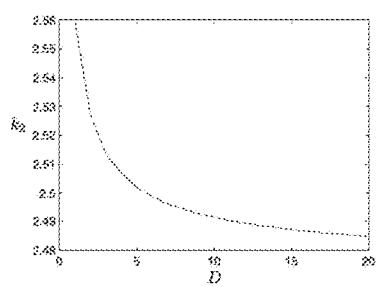
Figure 26C:
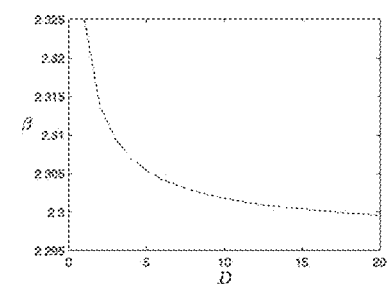

Although we cannot perfectly simulate the no-flow experiments, the effects of the concentration variation along the fiber boundary and the variation with time are small. Due to the etch rates for the experiments being calculated from the total change in the fiber width, this effectively gives us the average etch rate throughout the experiment. Thus, we will use the average surface concentration throughout each simulation as our best approximation for the surface concentration at the shoulder corresponding to the calculated experimental etch rate. Using these concentrations, we find the best-fit values for k1, k2, and $\beta$ (where we find $\alpha$=1.000 for all values of diffusivity). These values are shown in FIG. 26 where we can see all three values decrease as the diffusivity is increased and as D→∞ the values tend to those given in (25).

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

A computer system as described herein may be configured in a plurality of useful arrangements. In one approach, a data processing method comprises using a server computer, obtaining from one or more non-transitory computer-readable data storage media a copy of one or more sequences of instructions that are stored on the media and which when executed using a particular user computer among a plurality of user computers cause the particular user computer to perform, using the particular user computer alone or in combination with the server computer, the techniques that are described herein; and using the server computer, downloading the copy of the one or more sequences of instructions to any user computer among the plurality of user computers.

In another approach, a computer system comprises a server computer comprising one or more non-transitory computer-readable data storage media stored with one or more sequences of instructions which when executed using a particular user computer among a plurality of user computers cause the particular user computer to perform: using the particular user computer, alone or in combination with the server computer, the techniques that are described herein; and in the server computer, stored downloading instructions which, when executed using the server computer, cause downloading a plurality of copies of the one or more sequences of instructions to the plurality of user computers.

The foregoing describes only one embodiment of the present invention and modifications may be made thereto without departing from the scope of the invention.

What is claimed is:

1. A method of forming a capillary tube for electrospray ionization (ESI) having at least one tip with a desired tip profile, the method comprising:

providing a pre-finished capillary tube of substantially homogenous material, the capillary tube having a first end and an internal bore; and wet-etching the first end of the pre-finished capillary tube in an etchant for an etch duration and flowing a protective fluid through the internal bore of the capillary tube at a flow rate during the etch duration, wherein the flow rate and the etch duration are determined with a mathematical model that assumes a concentration gradient of etchant outwards from the outlet of the capillary with dilution over time to obtain the desired tip profile below a liquid level of the etchant.

2. The method as claimed in claim 1 wherein one or both of the flow rate and the etch duration is predetermined.

3. The method as claimed in claim 1 wherein one or both of the flow rate and the etch duration is predetermined by the mathematical model of a system including the etchant, the etching of the pre-finished capillary tube and the flow of protective fluid through the internal bore.

4. The method as claimed in claim 3 wherein the mathematical model uses Stokes flow for the velocity profile within the system.

5. The method as claimed in claim 4 wherein the mathematical model uses advection-diffusion equations for the concentration of the etchant.

6. The method as claimed in claim 3 wherein the mathematical model is run a plurality of times, each time with a different set of variable inputs to produce a plurality of simulated tip profiles and a preferred simulated tip profile is selected therefrom.

7. The method as claimed in claim 6 wherein the plurality of simulated tip profiles are compared to the desired tip profile to select the preferred simulated tip profile.

8. The method as claimed in claim 6 wherein the variable inputs to the mathematical model include density, viscosity and chemical composition of a protective fluid and the protective fluid selected for use is based on the inputs to the preferred simulated tip profile.

9. The method as claimed in claim 6 wherein the variable inputs to the mathematical model include flow rate of the protective fluid and the determined flow rate is based on the input flow rate to the preferred simulated tip profile.

10. The method as claimed in claim 6 wherein the determined etch duration is based on the preferred simulated tip profile.

11. The method as claimed in claim 1 wherein the flow rate of the protective fluid is determined to maintain the internal diameter of the capillary tube while minimizing the dilution of the etchant at the opening of the internal bore.

12. The method as claimed in claim 1 wherein the desired tip profile is substantially conical with a tapered end face extending at an angle which is measured from the edge of the internal bore to capillary tube outer diameter of <10 degrees, relative to a longitudinal axis through the internal bore.

13. The method as claimed in claim 1 wherein the desired tip profile is defined by the end face having varying angles of inclination relative to a longitudinal axis through the internal bore, which angles of inclination generally progress from higher to lower angles towards the opening of the internal bore.

14. The method as claimed in claim 1 further including chemically modifying the etched tip by a hydrophobic group through a silanization reaction using any one of the following silane reagents including: any linear, branched, cyclic, substituted and non-substituted phenyl; substituted and non-substituted phenyl-alkyl; and fluorinated alkyl-silane reagents with the alkyl chain containing more than 2 carbons and each silane's silicon covalently linked to more than one leaving group such as chloro, methoxyl or ethoxyl.

15. A method of forming a capillary tube for ESI, the capillary tube having at least one tip, the method comprising:
   providing a pre-finished capillary tube having a first end, a longitudinal axis and an internal bore with an opening at the first end; and
   wet-etching the first end of the capillary tube in a liquid etchant for an etch duration and flowing a protective fluid through the internal bore of the capillary tube into the etchant, at a flow rate during the etch duration to obtain a desired emitter tip profile at the at least one emitter tip, the desired emitter tip profile approximating a cone which is defined by a peripheral wall having varying angles of inclination relative to the longitudinal axis which generally progress from higher to lower angles towards the opening of the internal bore;
   wherein the flow rate and the etch duration are determined with a mathematical model that assumes a concentration gradient of etchant outwards from the outlet of the capillary with dilution over time to obtain the desired tip profile.

16. The method as claimed in claim 15 wherein the lowest angle of inclination of the end face is towards the opening.

17. The method as claimed in claim 15 wherein the pre-finished capillary tube has an inside diameter within the range of 4-10 µm.

18. The method as claimed in claim 15 wherein the resulting emitter tip profile following the wet-etching has an annulus with an inner radius of 2.5-25 µm and an outer radius of 5-80 µm.

19. The method as claimed in claim 15 wherein the capillary tube has a plurality of internal bores with an emitter tip at the termination of each internal bore.

20. The method as claimed in claim 19 wherein the flow rate of protective fluid is equally divided between the plural capillary bores.

\* \* \* \* \*